United States Patent

[11] 3,582,888

[72] Inventors Dzintars Abuls
Dayton;
Robert A. Phelps, Kettering, both of, Ohio

[21] Appl. No. 750,854
[22] Filed Aug. 7, 1968
[45] Patented June 1, 1971
[73] Assignee The National Cash Register Company
Dayton, Ohio

[54] OPTICAL CHARACTER READER EMPLOYING INFORMATION MODULATED SCANNING TECHNIQUES
2 Claims, 20 Drawing Figs.

[52] U.S. Cl. .................................................... 340/146.3
[51] Int. Cl. .................................................... G06k 9/12
[50] Field of Search .................................................... 340/146.3

[56] References Cited

UNITED STATES PATENTS

| | | | |
|---|---|---|---|
| 3,050,581 | 8/1962 | Bomba et al. | 340/146.3UX |
| 3,295,105 | 12/1966 | Gray et al. | 340/146.3 |
| 3,346,845 | 10/1967 | Fomenko | 340/146.3 |
| 3,429,989 | 2/1969 | Stockdale | 340/146.3X |

*Primary Examiner*—Maynard R. Wilbur
*Assistant Examiner*—Leo H. Boudreau
*Attorneys*—Louis A. Kline, John J. Callahan and Glenn W. Bowen, Sr.

ABSTRACT: An optical character reader is disclosed which employs a scanning beam to scan a character that is being read and a photocell to sense the variation in light intensity which occurs as the scanning beam traverses the character. The output of the photocell is quantized and is sent to an information analyzer after it is determined that the sensed signal is from the character which is being read and is not the result of noise. The information analyzer receives and analyzes the character information that is received during a number of scan lines, and it employs this information to deflect the scanning beam when it is scanning selected segments of later scanned lines, so as to search for distinguishing characteristics of the various characters which can be recognized. The character information that is received during various segments of the scan lines is selectively arithmetically combined and weighed against threshold values to enable the reader to recognize a number of different characters. The character recognition signals that are produced in the reader may be developed by either digital or analog means.

INVENTORS
DZINTARS ABULS &
ROBERT A. PHELPS

BY Louis A. Kline
John J. Callahan
Glenn W. Rowe

THEIR ATTORNEYS

INVENTORS
DZINTARS ABULS &
ROBERT A. PHELPS

BY Louis A. Kline
John J. Callahan
Glenn W. Bowes
THEIR ATTORNEYS

INVENTORS
DZINTARS ABULS &
ROBERT A. PHELPS
BY Louis A Kline
John J. Callahan
Glenn W. Bowes
THEIR ATTORNEYS INVENTORS
DZINTARS ABULS &
ROBERT A. PHELPS
BY Louis A. Kline
John J. Callahan
Glenn W. Bowes
THEIR ATTORNEYS INVENTORS
DZINTARS ABULS &
ROBERT A. PHELPS
BY Louis A Kline
John J. Callahan
Glenn W. Bowles
THEIR ATTORNEYS INVENTORS
DZINTARS ABULS &
ROBERT A. PHELPS
BY Louis A. Kline
John J. Callahan
Norman N. Bowes
THEIR ATTORNEYS INVENTORS
DZINTARS ABULS &
ROBERT A. PHELPS
BY Louis A. Kline
John J. Callahan
Glenn W. Bowe
THEIR ATTORNEYS

INVENTORS
DZINTARS ABULS &
ROBERT A. PHELPS

BY Louis A. Kline
John J. Callahan
Glenn W. Bowen
THEIR ATTORNEYS

INVENTORS
DZINTARS ABULS &
ROBERT A. PHELPS

BY Louis A. Kline
John J. Callahan
Glenn W. Bowen

THEIR ATTORNEYS

INVENTORS
DZINTARS ABULS &
ROBERT A. PHELPS
BY Louis A. Kline
John J. Callahan
Glenn W. Bowers
THEIR ATTORNEYS

INVENTORS
DZINTARS ABULS &
ROBERT A. PHELPS

BY [signatures]

THEIR ATTORNEYS

INVENTORS
DZINTARS ABULS &
ROBERT A. PHELPS
BY Louis A. Kline
John J. Callahan
Glenn W. Bowe
THEIR ATTORNEYS INVENTORS
DZINTARS ABULS &
ROBERT A. PHELPS
BY Louis A Kline
John J. Callahan
Glenn W. Bowes
THEIR ATTORNEYS INVENTORS
DZINTARS ABULS &
ROBERT A. PHELPS
BY Louis A Kline
John J. Callahan
Glenn W. Bowen
THEIR ATTORNEYS INVENTORS
DZINTARS ABULS &
ROBERT A. PHELPS
BY Louis A. Kline
John J. Callahan
Edwin W. Bones
THEIR ATTORNEYS INVENTORS
DZINTARS ABULS &
ROBERT A. PHELPS
BY Louis A Kline
John J. Callahan
Glenn W. Bowes
THEIR ATTORNEYS INVENTORS
DZINTARS ABULS &
ROBERT A. PHELPS
BY Louis A. Kline
John J. Callahan
Glenn W. Bowes
THEIR ATTORNEYS INVENTORS
DZINTARS ABULS &
ROBERT A. PHELPS
BY [signatures]
THEIR ATTORNEYS

INVENTORS
DZINTARS ABULS &
ROBERT A. PHELPS

BY

THEIR ATTORNEYS

OPTICAL CHARACTER READER EMPLOYING INFORMATION MODULATED SCANNING TECHNIQUES

BACKGROUND OF THE INVENTION

One of the most difficult problems encountered in optical character recognition readers which employ scanning techniques is the accurate determination of the position of the leading edge of the character which is being read. The leading edge of the character being read may be difficult to locate because extraneous spots or variations in the reflectivity of the surface on which the character appears can cause an incorrect indication to the recognition circuitry that a character has been located.

The present invention employs a scanning technique in which the character to be recognized is scanned along successive scan lines which are nominally parallel to each other. However, the recognition portion of each scan line begins only after it is positively determined that the scanning beam is traversing the character. In the optical character reader, therefore, the recognition portion of every scan line of the character is not determined solely by the first few scans that traverse the character. Instead, the recognition portion of each individual scan line of the preferred embodiment of the present scanning technique is initiated only after it is determined that the scanning beam has begun to traverse the character.

To implement the present scanning technique, it was found that it was necessary to introduce a further modification of the scan lines. Use of a directional scan of parallel scan lines that are all individually initiated would result in identical recognition signals for certain characters. The character information that is received by the reader during the scan of a first group of scan lines is modified to selectively deflect various segments of later scanned lines in order to distinguish between a large number of recognizable characters.

SUMMARY OF THE INVENTION

A character recognition system employing information modulated scanning techniques wherein subsequent recognition scans have segments which are modulated or deflected in accordance with the information that is obtained from earlier scanned lines. The resulting character information signals are selectively arithmetically combined and weighed against threshold values to recognize a large number of different characters.

BRIEF DESCRIPTION OF THE PREFERRED EMBODIMENTS

Figure 1:
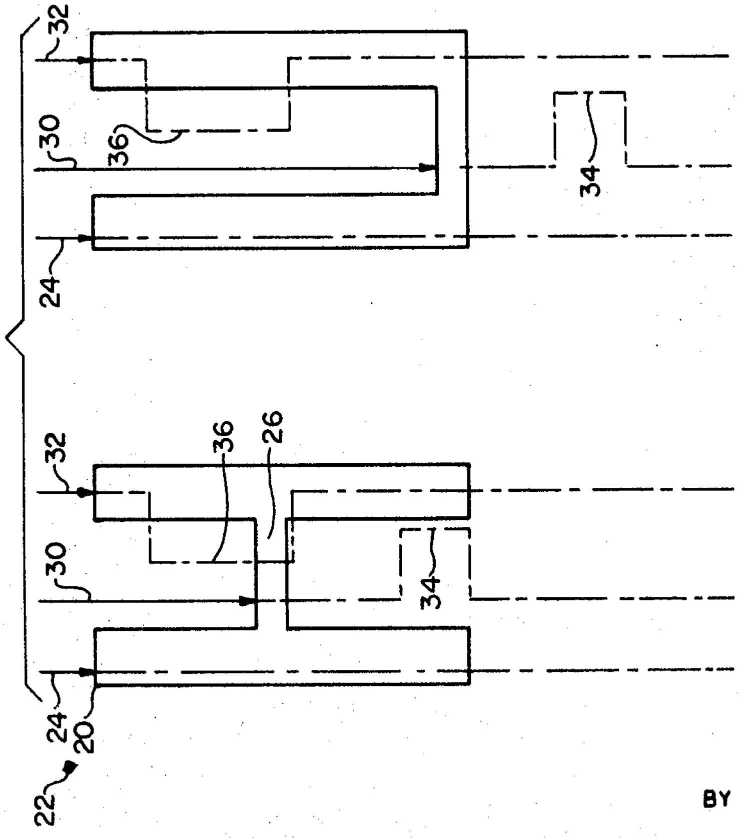
FIG. 1 is a diagrammatic representation of the scanning technique of the present invention and illustrates how this scanning technique enables the character reader to distinguish between different characters.

FIG. 1 illustrates the scanning technique of the optical character reader of the present invention. In order to accurately recognize a character by optical scanning techniques, the character recognition portion of the scan should be initiated at the upper left-hand portion of the character, such as the point 20, when the scan progresses from the top to the bottom of the character and from the left-hand edge of the character to the right-hand edge, as shown in FIG. 1, in which the scans 24, 30, and 32 are successive scans in that order, respectively. The appearance of an extraneous speck of dirt or spot upon the surface on which the character to be read is imprinted, such as the spot 22, could cause the scan to begin at the spot 22 instead of at the point 20 unless provision is made to overcome this, as it is in the present optical character reader. Improper initiation of the recognition portion of the scan lines of an optical character reader can result in recognition errors.

FIG. 1 shows the preferred method of scanning that is employed in the present invention. With this scanning technique, the information that is received by the recognition circuitry during the recognition portion of the scan line 24 enables the character reader to distinguish between different characters such as H and U. In the preferred embodiment, a modulation or deflection of later scan lines such as scan lines 30 and 32 is dependent upon the information that is sensed during the recognition portion of the scan line 24.

It will be recognized that, although a particular type of deflection is employed in the preferred embodiment, it is by no means the only type of deflection of the scan lines that may be used within the scope of the present invention. For example, various obvious modifications within the scope of the present invention may be easily visualized by recognizing that the various different types of comparison information may be obtained during the recognition portion of scan lines other than the scan line 24. For example, the scanning pattern may be broken into four or more groups, and the first scanning group can be employed to modulate the scan lines in the second scan group, whereas the information received from the third scan group could be employed to modulate the scans in the fourth scan group, and so on. Moreover, it is not essential to modulate the scan solely in the X-direction, as is done in the preferred embodiment, since the Y-modulation may also be employed; or, alternately, modulation in both the X- and the Y-directions may be implemented. The essential aspect of the present invention, as far as the scanning technique is concerned, is that each scan line is provided with a determination of where the reading portion of that particular scan line should be initiated, and the information that is obtained from the recognition portion of a prior scan line is then used to deflect at least one subsequent scan, so as to enable the reader to distinguish the peculiar characteristics of the characters which are to be recognized from one another.

Another obvious alternative method of implementing the scan of the present invention which is included in the scope of the present invention is to allow the first scan line of a group of scan lines to determine the initial starting point for a limited number of subsequent scan lines. It is also to be noted that the number of clock pulses which occur during the various segments of the scan lines in the preferred embodiment are not equal. It is not essential, however, that they be unequal, since the various segments of the scan lines of the optical character reader could be associated with equal clock pulses, although this may result in a somewhat less precise recognition system.

In the preferred embodiment, the scan lines 24 which traverse the characters H and U of FIG. 1 both produce the same recognition information. Therefore, in the preferred embodiment, the subsequent scan lines 30 and 32 are modulated in a predetermined manner, so that the scan line 30 has a segment 34, which is deflected in a rightward direction, while the scan line 32 has a segment 36, which is deflected in a leftward direction. Since the recognition portion of the scan line 30 begins at the leading edge of the respective characters H and U (that is, it begins at the tip of the arrowhead on the line 30 of FIG. 1), the recognition information that is received during the scan line 30 will be essentially the same for both the characters. However, the leftward deflection of the scan line 32 during the segment 36 will produce distinguishing character information, since the segment 36 will traverse the crossbar 26 of the letter H, whereas the segment 36, when a U is being read, will merely traverse a blank space. In this manner, it is possible for the optical character recognition reader to distinguish between a large number of different alpha-numeric characters.

Figure 3A:
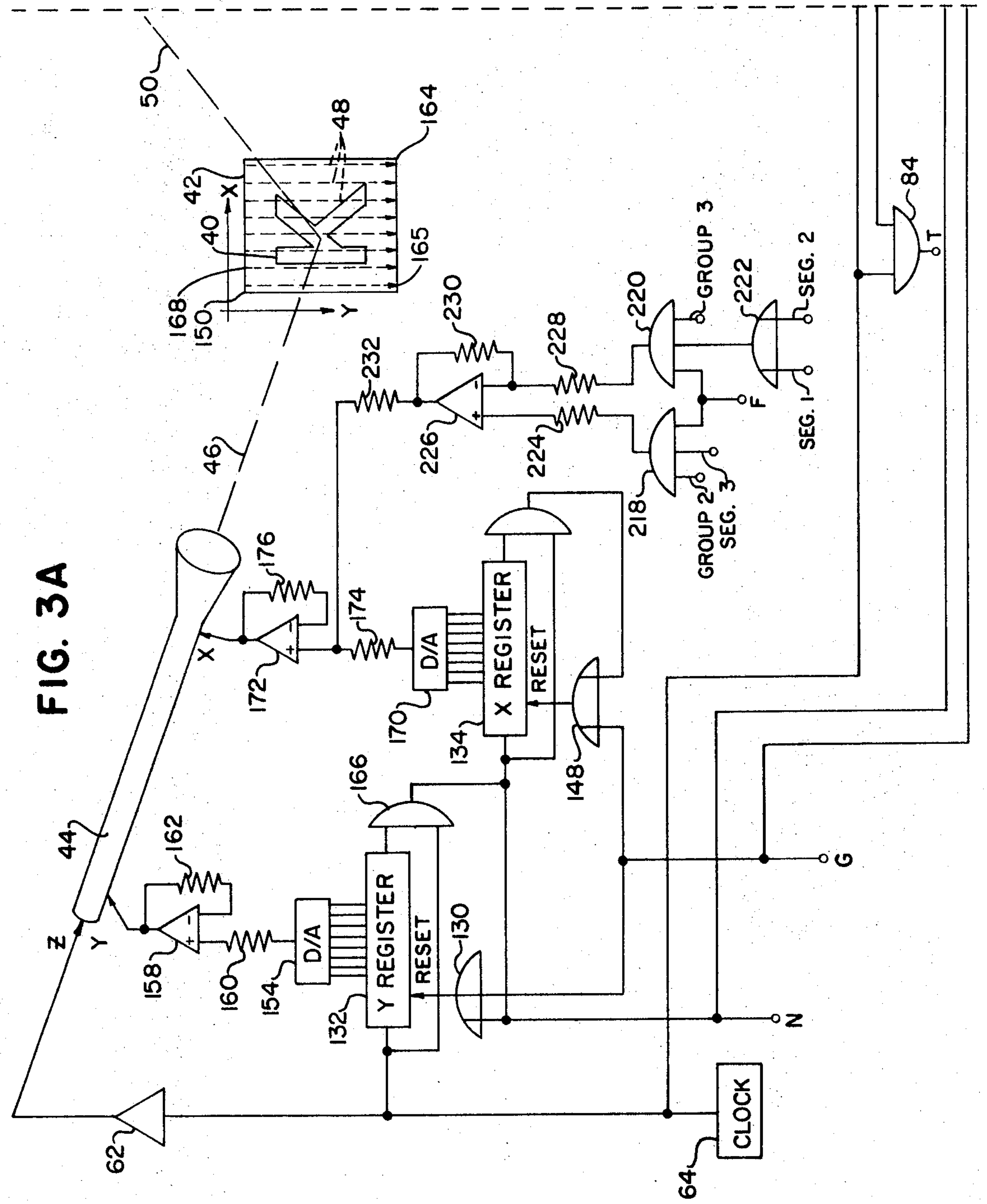
FIGS. 3A and 3B are a block diagram representation of the scanning and the scan initiation portion of the present invention.

The character 40 that is to be read is shown in FIG. 3A as a K which is imprinted on a record material 42. The scanning tube 44 produces a scanning beam 46, which traverses the character 40 in a number of successive scan lines 48, which proceed in the direction indicated by the arrowheads. A reflected beam 50 is received by the photocell 52. The reflected beam 50 received by the photocell 52 is coupled to the amplifier 54, which in turn is coupled to the threshold circuit 56. The threshold voltage of the threshold circuit 56 is determined by the setting of the variable threshold resistor 58. Since threshold circuits and the other circuits employed in the preferred embodiment are well known to those skilled in the art, the illustrated drawings employ a block diagram representation of these circuits.

An output signal is produced by the threshold circuit 56 only when the reflected beam intensity exceeds a predetermined threshold level as determined by the setting of the threshold resistor 58. The output of the threshold circuit 56 is a series of pulses, since the scanning beam from the scanning tube is not a continuous beam, but it is rather a pulsed one which results from the application of successive voltage pulses to the Z-input terminal of the scanning tube 44 each time that the clock 64 supplies a clock pulse to the beam control amplifier 62.

The counter 60, which is coupled to the threshold circuit 56, counts the number of received signals that are passed through the photocell 52, the amplifier 54, and the threshold circuit 56. The threshold circuit 56 is coupled to the flip-flop 66, which is set upon the receipt of the first signal that passes through the threshold circuit 56. One input to the AND gate 68 is coupled to the clock 64, and the other input is coupled to the reset output terminal of the flip-flop 66, which output terminal is at a "1" level when the flip-flop 66 is set. Therefore, following the initial setting of the flip-flop 66, each subsequent clock pulse from the clock 64 is gated through the AND gate 68 to the counter 70 until such time as the flip-flop 66 is reset.

The output stages of both of the counters 60 and 70 are coupled to the AND gate 72. The AND gate 72 will, therefore, be satisfied only when the counts of both the counters 60 and 70 are completed at the same time. This is the manner by which the character recognition system determines whether the scanning beam 46 has encountered an extraneous spot or whether it has encountered a character which is to be read. It is assumed that, if an extraneous spot has been encountered, the spot will be of relatively small dimensions, and, therefore, the count in the counter 70 will not be completed at the time the count in the counter 60 is completed, and the AND gate 72 will not be satisfied. However, when the character is encountered, the counts in the counters 60 and 70 will both be completed simultaneously, and therefore the AND gate 72 will be satisfied. Each time that the counter 70 completes its count, it applies a reset signal to the counter 60 through the OR gate 74, and it also supplies a reset signal to the flip-flop 66 through the OR gate 76, and, in addition, it resets itself through the OR gate 78. In this manner, once the flip-flop 66 is set, the counter 70 continuously cycles through its counting stages. Thus, the recognition portion of each scan line is initiated independently of every other scan line.

Once a scan line has encountered a character and the AND gate 72 has been satisfied, the flip-flop 80 will be set. The reset output of the flip-flop 80, which is a "1" when the flip-flop 80 is set, is applied to the AND gate 82. The other input of the AND gate 82 is derived from the threshold circuit 56. Once the flip-flop 80 is set, each received signal which is passed through the threshold circuit 56 produces a Q-output signal at the output of the AND gate 82. The Q-output signal corresponds to those reflections that are received from the character being read which exceed a predetermined minimum intensity. The output of the flip-flop 80 is also coupled to the AND gate 84. The other input of the AND gate 84 is coupled to the clock 64, and the T-output signal of the AND gate 84 is, therefore, a pulsed signal which occurs in phase with the clock signal whenever the scanning beam 46 is traversing the character 40 which is being read.

Figure 4:
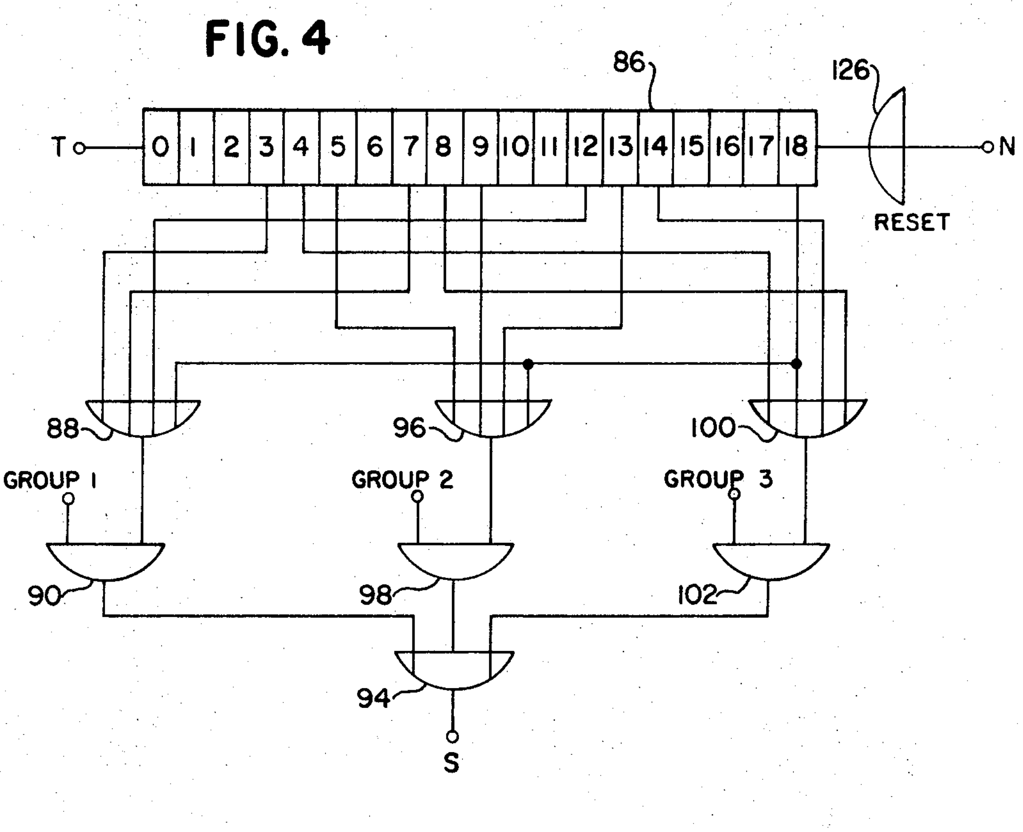
FIG. 4 is a block diagram representation of the register and its associated gating circuitry which is used to generate the segment gating signals that are utilized in the character reader.
Figure 5:
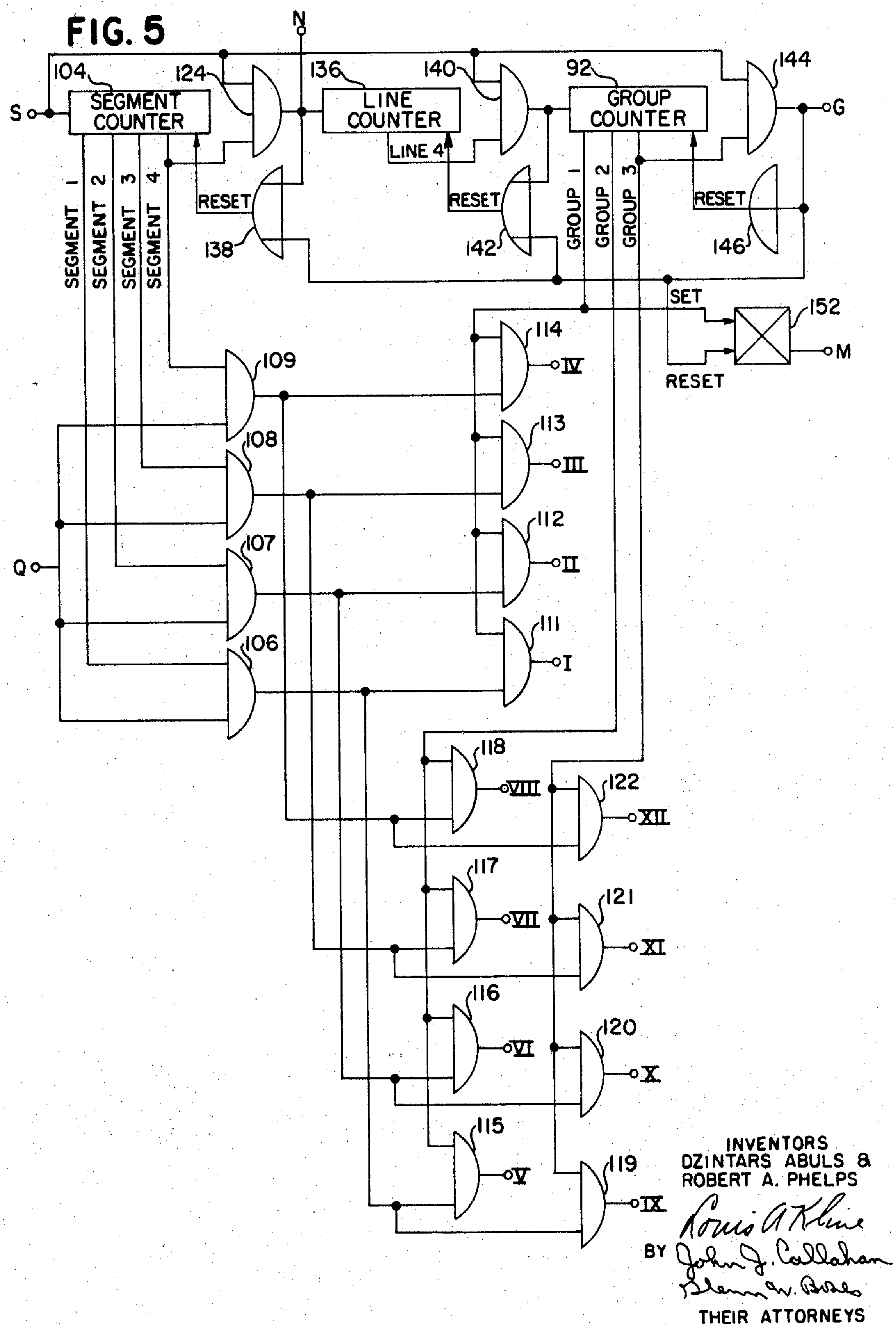
FIG. 5 is a block diagram representation of the segment, line and group counter, and group gating portions of the optical character reader.

The T-output signal of the AND gate 84 is coupled to the register 84 of FIG. 4. The register 86 of FIG. 4 is initially in the reset, or "0, " count stage. Upon the receipt of three successive T-signals, the count in the register 86 steps to the count "3." The output of the "3" count stage of the register 86 is coupled to the OR gate 88. The output of the OR gate 88 is coupled to the AND gate 90. The other input of the AND gate 90 is a group 1 signal which is derived from the group counter 92, which is shown in FIG. 5. The group counter 92 is initially in a group 1 count state, and, therefore, the first time that the register 86 reaches the count of "3" during the scan of the character 40, the AND gate 90 is satisfied, and an S-signal is produced, since the output of the AND gate 90 is coupled to the OR gate 94, the output of which is the S-signal. The S-signal is also produced when the group counter 92 is in the group 1 count state when the count of the register 86 has reached the counts of "7," "12," and "18." Similarly, when the count of the group counter 92 has stepped to a group 2 or a group 3 count stage, in a manner which will be described subsequently, an S-signal will be produced at the counts of "5," "9," "13," and "18;" and at the counts of "4," "8," "14,' ' and "18," respectively. The counts associated with group 2 are passed through the OR gate 96 and through the AND gate 98 when the group counter 92 is in the group 2 count state. The counts associated with group 3 are passed through the OR gate 100 and through the AND gate 102 when the group counter 92 is in the group 3 state.

Figure 2:
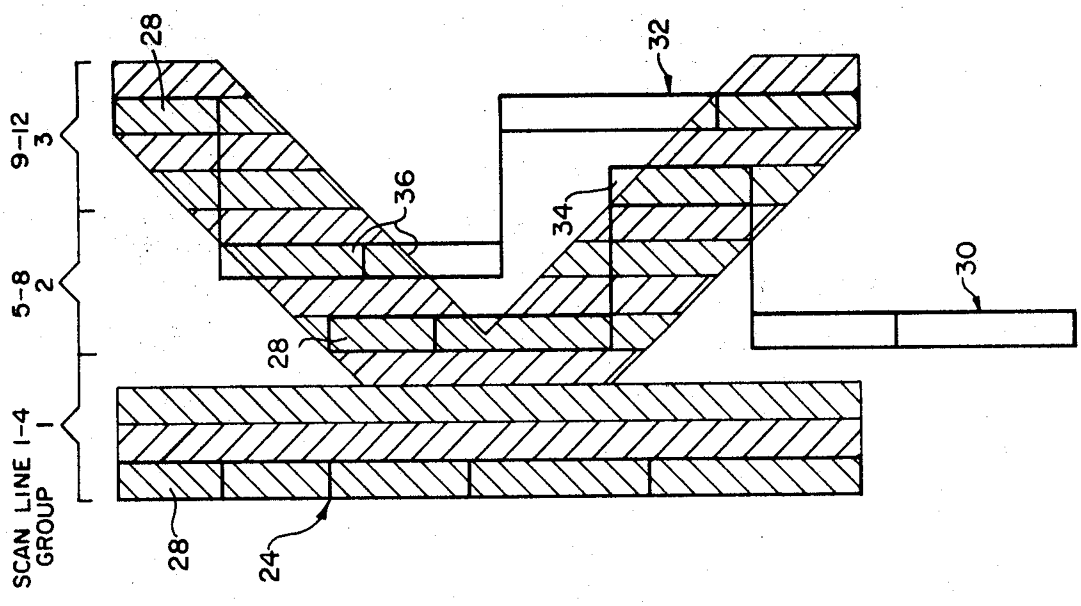
FIG. 2 is a diagrammatic representation of the scanning technique of the present invention as it is employed to recognize a K.

The S-signal from the OR gate 94 is coupled to the segment counter 104 of FIG. 5. As is shown in FIG. 2, each recognition scan line has four recognition segments and one reference segment. The reference segment 28 is the portion of the scan that is used to determine whether or not the flip-flop 80 of FIG. 3B should be set by comparison of the counts in the counters 60 and 70, as previously described. The segment counter 104 is initially set to the segment 1 count state. The segment 1 count of the segment counter 104 is supplied to the AND gate 106. The other input of the AND gate 106 is supplied with the Q-signal from the AND gate 82 of FIG. 3B. Thus any Q-signals that are passed through the AND gate 82 of FIG. 3B will also be passed through the AND gate 106, when the segment counter 104 is in the segment 1 count state. The output of the AND gate 106 is also coupled to the input of the AND gates 111, 115, and 119. The other input of the AND gate 111 is supplied by the group 1 count stage of the group counter 92. The AND gate 115 is coupled to the group 2 count stage of the group counter 92, while the AND gate 119 is coupled to the group 3 count stage of the group counter 92. Thus, the AND gate 111 will produce a "1" output signal whenever a Q-signal is received during the first recognition segment 28 of any scan line in the first group of scan lines. The AND gate 115 will produce a "1" output signal whenever a Q-signal is received during the first recognition scan segment of any scan line in the second group of scan lines. The AND gate 119 will produce a "1" output signal whenever a Q-signal is received during the first recognition segment of any scan line in the third group of scan lines.

After the first S-signal is received by the segment counter 104 from the OR gate 94, it steps its count to the segment 2 count state. This indicates that three clock pulses were supplied during the first scan segment of the line being scanned. The segment 2 count of the segment counter 104 is employed to gate the Q-signal through the AND gate 107 to the AND gates 112, 116, and 120. Output signals result from the AND gates 112, 116, and 120 whenever a Q-signal is received during a segment 2 portion of a scan line in groups 1, 2, and 3, respectively. In a similar manner, the AND gate 108 is employed to gate the Q-signals to the AND gates 113, 117, and 121 during the segment 3 portion of the various scan lines. The AND gate 109 couples Q-signals to the AND gates 114, 118, and 122 during the segment 4 portion of the associated scan lines.

Figure 3B:
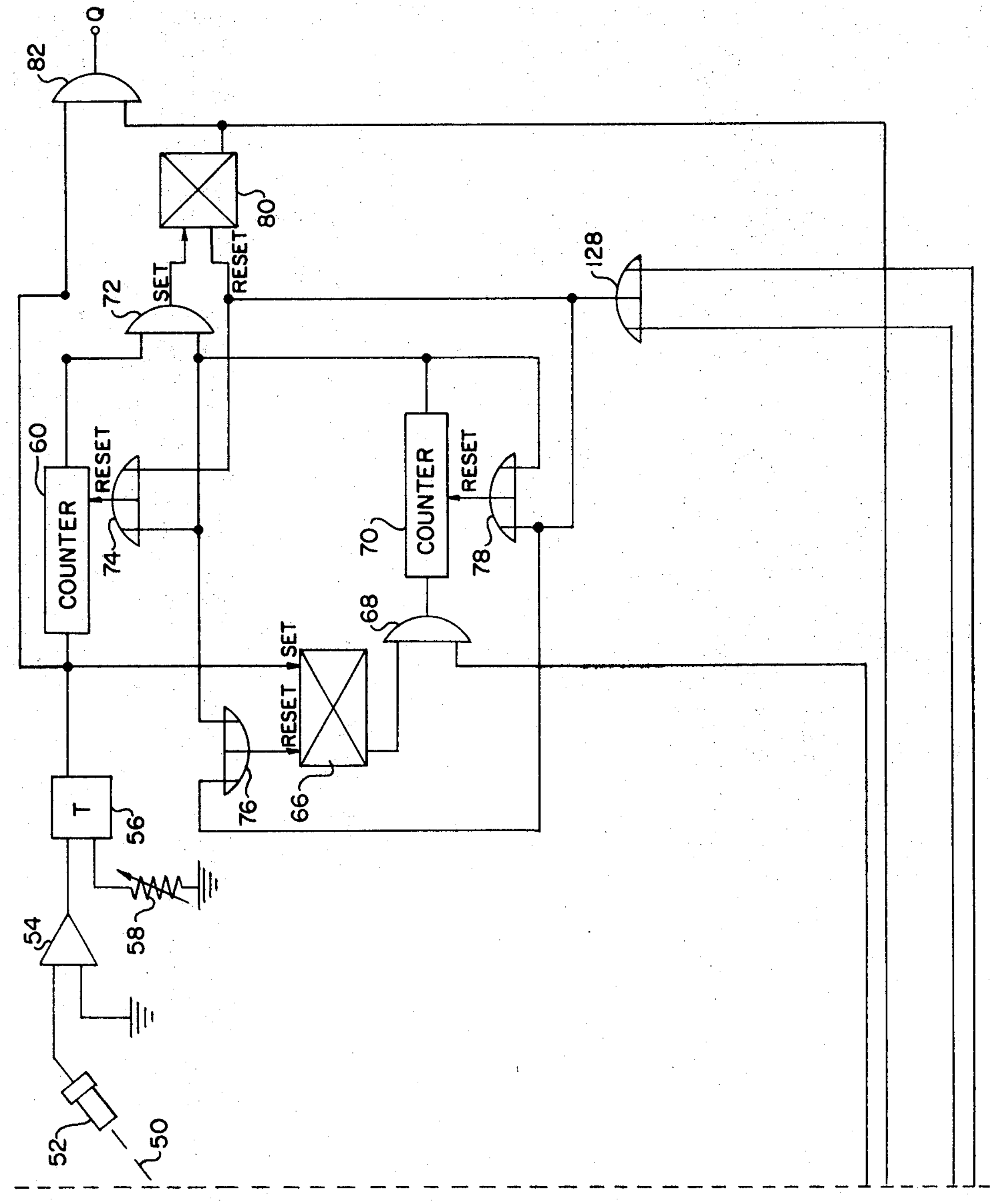

Upon receipt of the signal from the register 86 of FIG. 4, which occurs at the count of "18" when the group counter 92 is in a group 3 count state, one input of the AND gate 124 is satisfied by the segment 4 count of the segment counter 104, and the other input of the AND gate 124 is satisfied by the S signal that is supplied by the OR gate 94 of FIG. 4. The output of the AND gate 124 is also supplied to the OR gate 126 of FIG. 4 to reset the register 86. The register 86 is reset to a 0 count state each time that four scan segments have been completed regardless of the group that the particular scan line is in. The N-signal from the AND gate 124 is also supplied to the OR gate 128 of FIG. 3B. The OR gate 128 supplies a reset signal to the flip-flop 80, the counter 70 through the OR gate 78, the flip-flop 66 through the OR gate 76, and the counter 60 through the OR gate 74. Each time that an N-signal is received, it signifies that the recognition portion of the particular scan line has been completed, and, therefore, the reading initiation portion of the character reader that is shown in FIGS. 3A and 3B must be reset to its initial condition.

The N-output signal is coupled to the OR gate 130 of FIG. 3A, so that it resets the Y-register 132, which is employed to position the scanning beam 46 in the Y-direction. The N-signal output is also supplied to the X-register 134, so that each N-signal that is received by the X-register increases the count of the X-register 134. The X-register 134 is employed to locate the X-position of the scanning beam 46, as will be described more fully subsequently. The N-signal from the AND gate 124 is also coupled to the line counter 136 of FIG. 5. The line counter 136 counts the number of lines that are scanned in each scan group. The N-signal is in addition coupled to the OR gate 138, which resets the segment counter 104 upon the completion of the reading portion of one complete scan line.

The AND gate 140 is satisfied by the coincidence of a signal from the line 4 count stage of the line counter 136 and the S-signal from the OR gate 94 of FIG. 4. The output from the AND gate 140 is coupled to the OR gate 142, which resets the line counter 136 each time that four lines are counted. The output of the AND gate 140 is also coupled to the group counter 92, which is also a three-stage counter that is employed to count the number of groups of four lines each that have scanned the character 40 during the reading portion of the scan cycle.

Upon the completion of three counts of the group counter 92, the AND gate 144 will be satisfied by the coincidence of the S-signal from the OR gate 94 and a group 3 count signal from the group counter 92. The output from the AND gate 144 is termed a G-signal, and it is supplied to the OR gate 146 to reset the group counter 92. The G-signal is also supplied to the OR gates 138 and 142 to insure that the segment counter 104 and the line counter 106 are returned to their zero count states upon completion of the reading portion of the scan cycle. The output of the AND gate 144 is also supplied to the OR gate 128 of FIG. 3B to insure that the flip-flop 80 is reset, that the flip-flop 66 is reset, and that the counters 60 and 70 are returned to their initial count stage upon completion of the reading portion of the scan cycle. The G-signal is in addition supplied to the OR gate 130 of FIG. 3A to reset the Y-register 132 and to the OR gate 148 to reset the X-register 134, when the scanning beam reaches the point 164, so that the scanning beam 46 will be returned to its initial starting location, as indicated by the point 150 of FIG. 3A.

When the group counter 92 is in a group 1 count state, the output of the group 1 count stage is employed to set the flip-flop 152. The reset output of the flip-flop 152, which is 1 when the flip-flop 152 is set, produces an M-signal. The G-signal that is produced by the AND gate 144 upon the completion of the third group of scans resets the flip-flop 152. The M-signal, therefore, indicates when the recognition portion of the scan of the character 40 is in the group 1 portion of the scan and not the group 2 or group 3 portions of the scan.

As previously mentioned, the scanning beam 46 is initially located at the point 150 of FIG. 3A when the Y-register 132 and the X-register 134 are in their initial, or 0, count states. Each time that the clock 64 supplies a pulse to the beam control amplifier 62, it also supplies a counting pulse to the input stage of the Y-register 132. Therefore, every time that the scanning beam 46 is energized, the Y-register 132 will be incremented by the count of 1, and the scanning beam will proceed down the page in the Y-direction, one step for each clock pulse that is received from the clock 64.

The output of the Y-register 132 is coupled to a digital-to-analog converter 154, which converts the digital count of the Y-register to a Y-analog position signal. The analog output voltage of the digital-to-analog converter 154 is supplied to the positive, or addition, terminal of the operational summing amplifier 158 through the resistor 160. The resistor 162, which is connected between the output terminal of the operational summing amplifier and the negative input terminal of the amplifier, is the feedback resistor that is required in an operational summing amplifier.

The output of the operational summing amplifier 158 is connected to the Y-input terminal of the scanning tube 44. After the Y-register has completed the number of counts required to bring the Y-scan from the position 150 to the position 165 on the record material 42, the count in the Y-register 132 is complete, and the AND gate 166, which has one input coupled to the output stage of the Y-register 132 and another input coupled to the clock 64, resets the Y-register 132 through the first stage of the OR gate 130.

The output of the AND gate 166 is also coupled to the first stage of the X-register 132, which uses this output signal as a counting pulse. Therefore, upon the completion of one count cycle of the Y-register 132, the X-register 134 is incremented by a count of 1, and the next scanning line is initiated at the position 168, which is displaced in the X-direction from the initial starting point 150. The output of the X-register 134 is also coupled to a digital-to-analog converter 170, which converts the digital count in the X-register 134 into an X-analog position. The X-analog position signal from the digital-to-analog converter 170 is coupled to the positive, or addition, terminal of the differential summing amplifier 172 through the input resistor 174. The resistor 176, which is connected between the output terminal and the negative, or subtraction, terminal of the differential summing amplifier 172, is the required feedback resistor. The output of the differential summing amplifier 172 is coupled to the X-input terminal of the scanning tube 44 to control the X-position of the scanning beam 46.

The signals I through XII of FIG. 5 are supplied by the AND gates 111 through 122 of FIG. 5 whenever a Q-signal is received and the scanning beam 46 is scanning the corresponding segment and group. The I signal is supplied to the counter 178 of FIG. 6A to increment its count. The counter 178, therefore, indicates the number of Q-signals that are passed through the threshold amplifier 56 of the FIG. 3B during the segment 1 portion of any scan line which occurs during group 1. Likewise, the signal II from the AND gate 112 is coupled to the counter 180, so that the counter 180 can count the number of Q-signals that are passed through the threshold amplifier 56 during the segment 2 portion of any scan that occurs during group 1. The III signal is supplied to the counter 182 of FIG. 6B, so that the counter 182 can count the number of Q-signals that are supplied through the threshold amplifier 56 during the segment 3 portion of any scan line in group 1. The IV signal is coupled to the counter 184, so that the counter 184 can count the number of Q-signals which pass through the threshold amplifier 56 during a segment 4 portion of any scan of group 1. In a similar manner, the counters 186 through 200 are employed to count the number of V through XII signals that are received by them, respectively. The signals V through XII indicate the Q-signals that are produced during the various segments of the scan lines that occur during the group 2 and group 3 portions of the scan cycle.

Figure 6A:
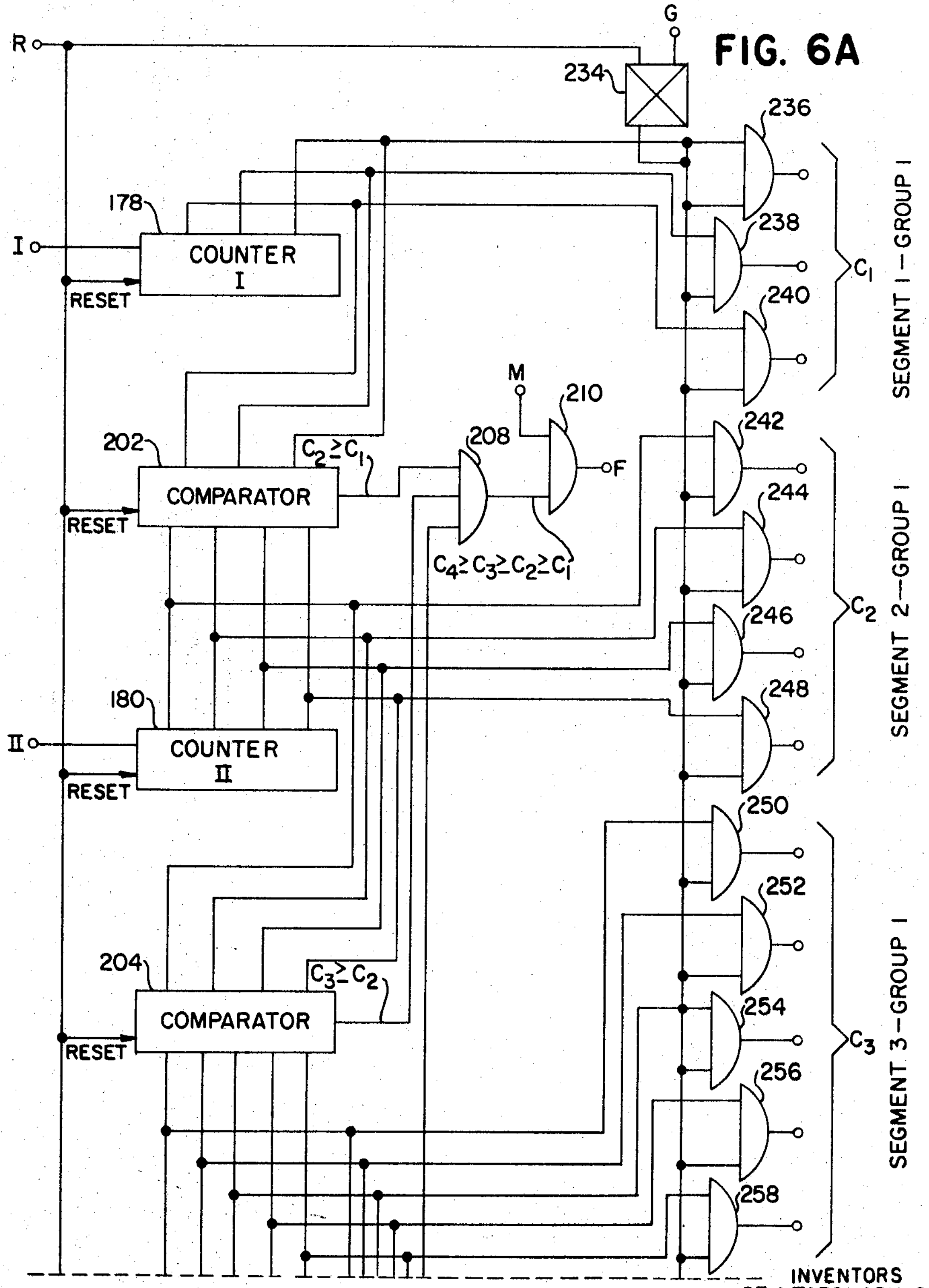
FIGS. 6A, 6B, 6C, 6D, and 6E are a block diagram representation of the segment recognition gating portion of the present invention.

The counter 178 of FIG. 6A is a three-stage counter that is coupled to the comparator 202. The counter 180 is a four-stage counter that is also coupled to the comparator 202. The comparator 202 provides a comparison between the count in the counter 180 and the count in the counter 178. The count in the counter 180 is designated as $C_2$, while the count in the counter 178 is designated by a $C_1$. The comparator 202 produces an output whenever the count in the counter 180 is greater than or equal to the count in the counter 178; that is, $C_2 \geq C_1$. In a similar manner, the count of the counter 180 is also supplied to the comparator 204, which also has inputs from the five-stage counter 182 of FIG. 6B. The comparator 204 compares the count of the counter 182 with the count of the counter 180 and produces an output whenever the count in the counter 182 is equal to or greater than the count in the counter 180; that is, $C_3 \geq C_2$. The five-stage counter 182 is also coupled to the comparator 206 of FIG. 6B, which also has input from the counter 184, which is a six-stage counter. The comparator 206 compares the count in the counter 184 with the count in the counter 182 and produces an output signal whenever the count in the counter 184 is equal to or greater than the count in the counter 182; that is, $C_4 \geq C_3$.

The outputs of the comparators 202, 204, and 206 are all coupled to the AND gate 208 of FIG. 6A. The AND gate 208 will be satisfied whenever all of the conditions which are specified by the comparators 202, 204, and 206 are satisfied; that is, the output of the AND gate will produce a signal whenever the count in the counter 184 is equal to or greater than the count in the counter 182, providing that this count is in turn equal to or greater than the count in the counter 180, providing that this count is in turn equal to or greater than the count in the counter 178; that is, if $C_4 \geq C_3 \geq C_2 \geq C_1$. The output of the AND gate 208 is coupled to the AND gate 210, which has an input from the reset output of the flip-flop 152 of FIG. 5. The M-input from the flip-flop 152 allows the comparison signal which is produced by the AND gate 208 to pass through the AND gate 210 only after the completion of the group 1 group of scan lines.

The F output signal of the AND gate 210 of FIG. 6A is coupled to the AND gate 218 of FIG. 3A. The other inputs of the AND gate 218 are derived from the segment 2 count stage of the segment counter 104 of FIG. 5 and from the group 2 count stage of the group counter 92 of the same figure. An output signal will be developed by the AND gate 218 only during the segment 2 and group 2 portions of the scan whenever an F-signal is also present. An F-signal will be present only when the required condition that is signified by the output of the AND gate 208 has been satisfied. Thus, if the required condition is satisfied, as it is when the letter K is being scanned, as indicated in FIG. 2, the AND gate 218 will produce an output signal during the segment 3 portion of the scan lines of group 2. The output of the AND gate 218 is coupled to the input resistor 224, which is connected to the positive input, or addition, terminal of the differential summing amplifier 226. The resistor 230, which is connected between the output terminal in the negative input, or subtraction, terminal of the differential summing amplifier 226, is the necessary feedback resistor.

The output of the differential summing amplifier 226 is coupled to the resistor 232, which is in parallel with the resistor 174 and is coupled to the positive, or addition, input terminal of the differential summing amplifier 172. In this manner, whenever the AND gate 218 is satisfied during the segment 2 portion of the group 2 scan lines, a positive output signal will be coupled through the differential summing amplifier 226 and the resistor 232 to the positive, or addition, input terminal of the differential summing amplifier 172. This will cause the scanning beam 46 to be deflected rightwardly—that is, in the direction of increasing X-count—during the segment 2 portion of the group 2 scan, as shown by segment 34 of FIG. 2.

The AND gate 220 also has inputs from the group 3 count stage of the group counter 92 and from the OR gate 222. The OR gate 222 has inputs from the segment 1 and the segment 2 count stages of the segment counter 104. The F-output of the AND gate 210 of FIG. 6A is also coupled to the AND gate 220. The output of the AND gate 220 is coupled through the input resistor 228 to the negative, or subtraction, input terminal of the differential summing amplifier 226. Thus, when the condition specified by the AND gate 208 is satisfied and an F-signal is produced, the AND gate 220 will be satisfied during the segment 1 or segment 2 portion of any scan line that appears in group 3, and therefore a negative output signal will be produced by the differential summing amplifier 226 during this time. The negative output signal of the differential summing amplifier 226 is coupled through the input resistor 232 to the positive, or addition, input terminal of the differential summing amplifier 172. In this manner, the scan of any line which occurs in segment 3 of group 2 will be deflected leftwardly—that is, in the direction of decreasing X-count—during this portion of the scan, as shown by the segments 36 of FIG. 2. It should be noted that each of the scan lines 24, 30, and 32 of FIG. 2 begin their recognition portions only after a predetermined length of reference segment, such as the segment 28, has been scanned in order to eliminate extraneous signals, as was previously described.

Although a number of different recognition schemes may be employed with the modulated scanning technique that has been described, there is no intention to limit the described scanning technique of the present invention exclusively to the character recognition scheme which is specifically described. The G-signal which is produced by the group counter 92 of FIG. 5 upon completion of the reading portion of the scan is supplied to the flip-flop 234 of FIG. 6A as a set signal. The reset output of the flip-flop 234 is a 1 when the flip-flop 234 is set, and it is supplied to the AND gates 236 through 342.

The AND gates 236 through 240 supply the count $C_1$, which is representative of the count in the counter 178. This count corresponds to the number of Q-signals that have passed through a threshold circuit 56 of FIG. 3B during the various segment 1 portions of the group 1 scan. The AND gates 242 through 248, in a similar manner, correspond to the count $C_2$, which is derived from the counter 180, and they represent the number of Q-signals that are passed through the threshold circuit 56 during the various segment 2 portions of the group 1 scan. The remaining AND gates and their corresponding segments and groups are shown in FIGS. 6A through 6E. The outputs of the AND gates 236 through 242 are gated to the recognition portion of the character reader at the termination of the recognition portion of the scan by the reset output of the flip-flop 234.

Figure 6B:
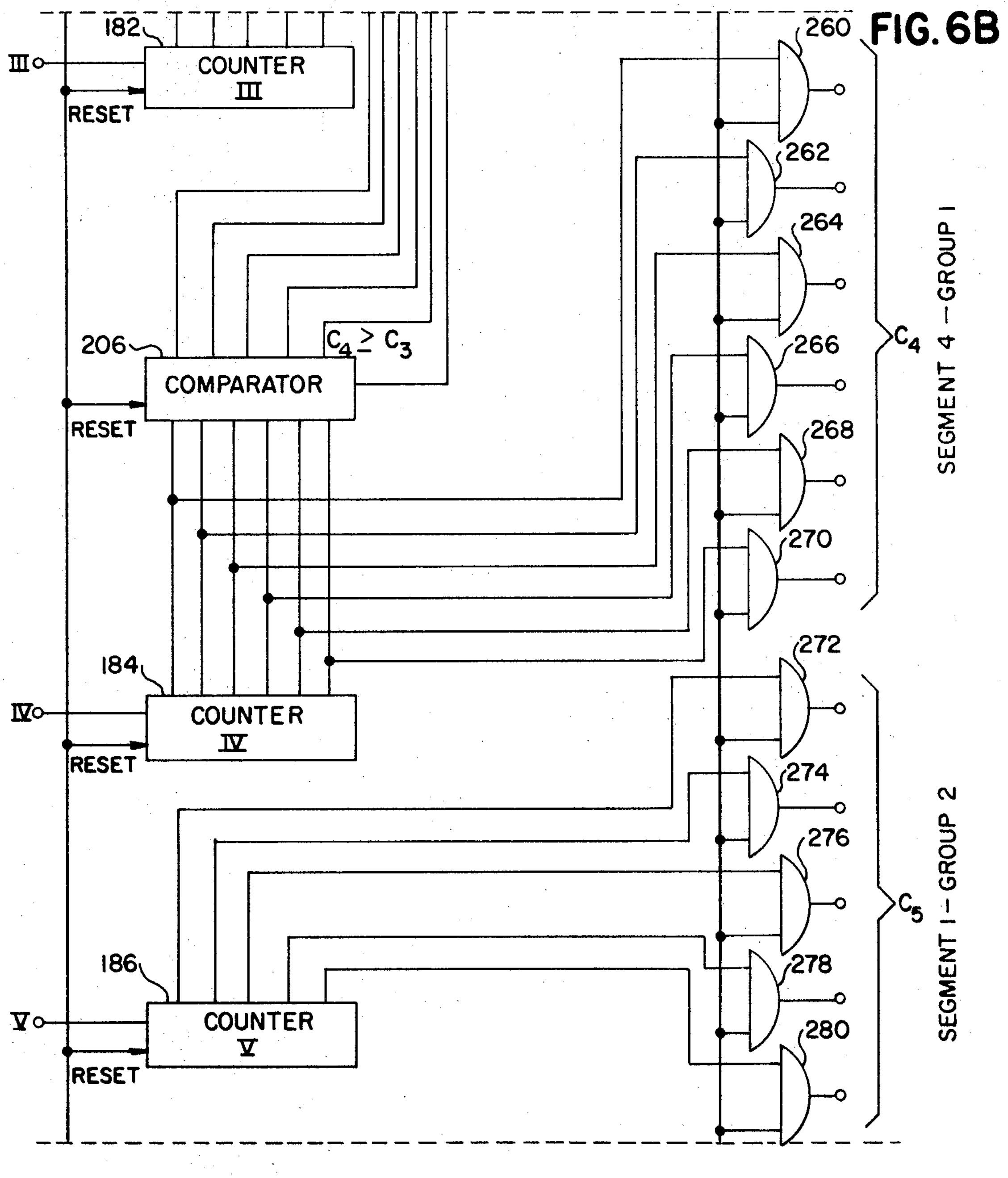
Figure 6C:
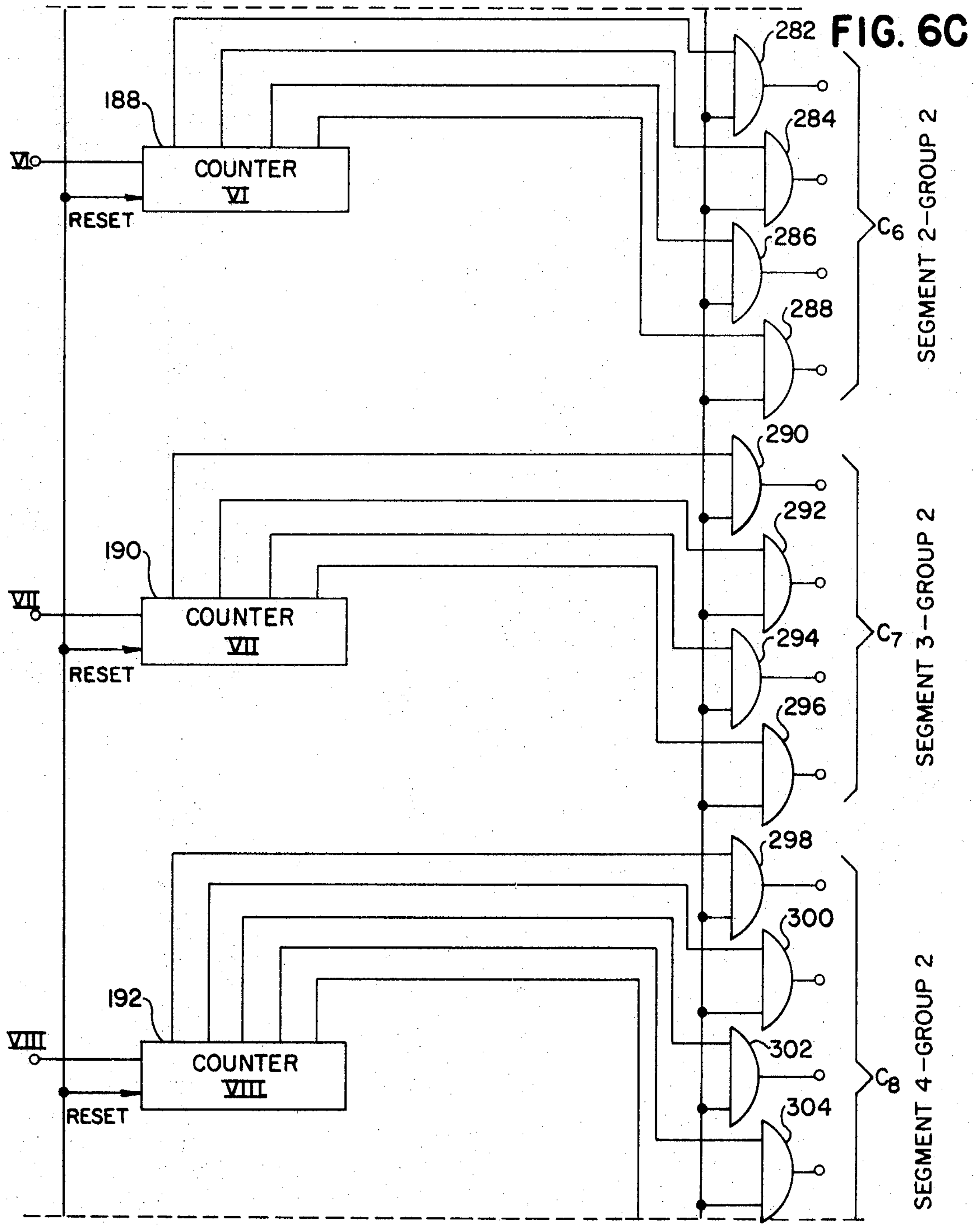
Figure 7:
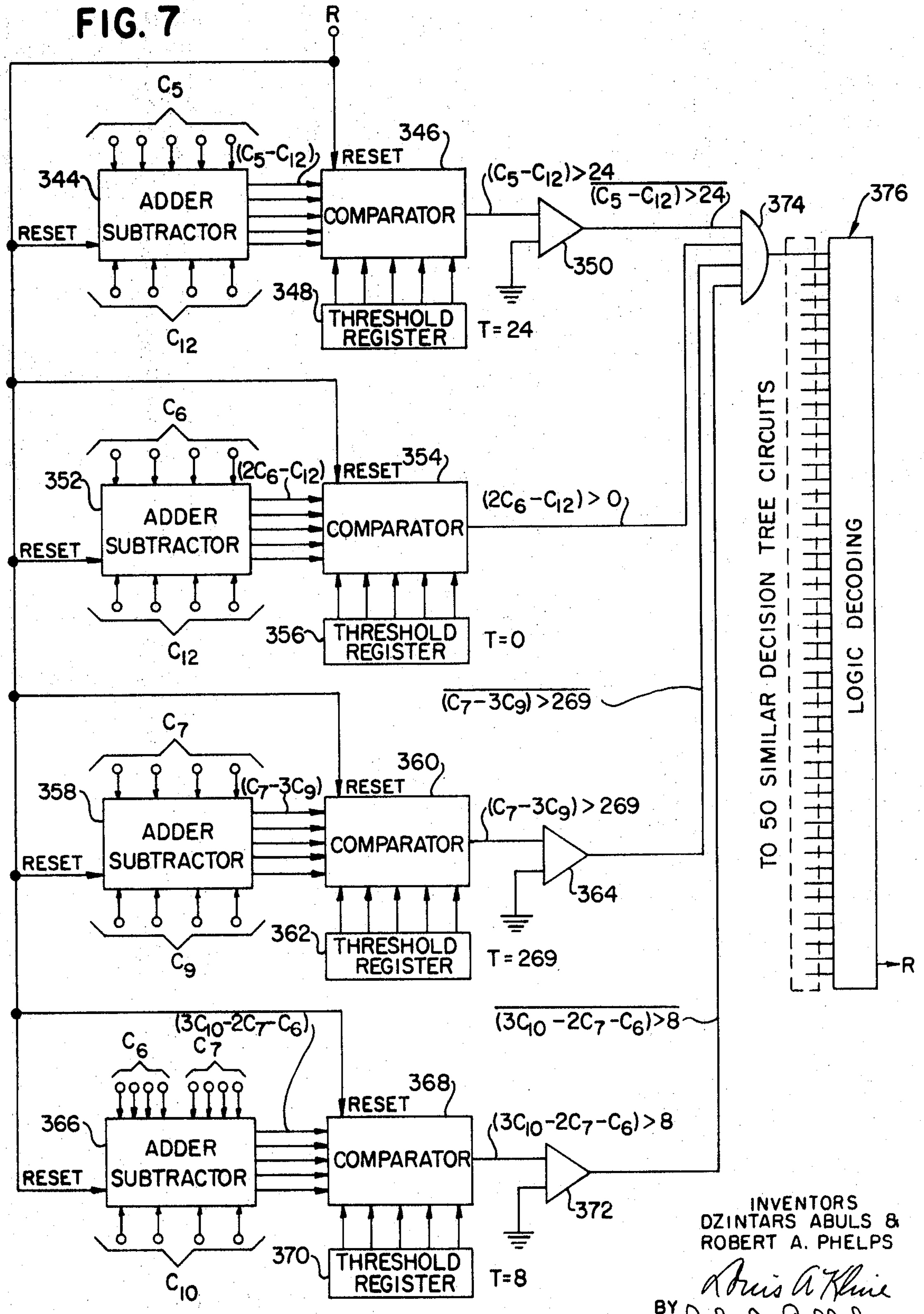
FIG. 7 is a block diagram representation of the digital implementation of the recognition logic circuitry that is required to recognize a K.

Recognition in the present invention may be implemented in either a digital or an analog manner. FIG. 7 shows the digital implementation required for a K. The $C_5$ count, which is derived from the counter 186 of FIG. 6B, is coupled through the AND gates 272 through 280 to the adder-subtracter 344. The $C_{12}$ count is derived from the counter 200 of FIG. 6E, and it corresponds to segment 4 of group 3, and it is also supplied to the adder-subtracter 344. The adder-subtracter 344 subtracts the $C_{12}$ count from the $C_5$ count and sends the subtracted count to the comparator 346. The comparator 346 also has inputs from a fixed threshold register 348, which in this embodiment holds a count of 24. The comparator 346 compares the output of the adder-subtracter 344 with the count in the threshold register 348, and it produces an output only if the count in the adder-subtracter 344 is greater than the count in the threshold register 348. The output of the comparator 346 is then inverted by the inverter 350, and this output signifies that the count of the adder-subtracter 344 is not greater than the count in the threshold register 348.

In a similar manner, the $C_{12}$ count is subtracted from two times the $C_6$ count by the adder-subtracter 352. The $C_6$ count is derived from the counter 188 of FIG. 6C, and it is associated with segment 2 of group 2. The output of the adder-subtracter 352 is fed to the comparator 354, which also has an input from the register 356. In this case, the threshold register 356 holds a count of 0; the output of the comparator 354 is not inverted; and, therefore, the output of the comparator 354 signifies that twice the $C_6$ count minus the $C_{12}$ count is greater than zero.

The adder-subtracter 358, the comparator 360, the threshold register 362, which is set to a count of 269, and the inverter 364 are similarly employed to produce an output signal when the $C_7$ count minus three times the $C_9$ count is not greater than 269. The $C_7$ count is associated with the segment 3 of group 2, and the $C_9$ count is associated with segment 1 of group 3. The adder-subtracter 366 has inputs from three separate counters, and it sends a count to the comparator 368 which is equal to three times the $C_{10}$ count minus two times the $C_7$ count minus the $C_6$ count. This count from the adder-subtracter 366 is compared with the count of 8 in the threshold register 370, and the output of the comparator 368 is inverted by the inverter 372 to produce a signal whenever the count from the adder-subtracter 366 is not greater than 8.

All of the outputs from the inverters 350, 364, and 372 and from the comparator 354 are coupled to the AND gate 374. An output from the AND gate 374 signifies that a K has been recognized, and this output may be coupled to a recognition decoding device 376 to achieve binary-to-decimal decoding, if desired. Upon completion of the desired decoding, a reset signal R will be supplied to the counters 178 through 200 of FIGS. 6A through 6E to the flip-flop 234 of FIG. 6A and to all of the adder-subtracters and comparators in the recognition section of the character reader, such as those shown in FIG. 7.

Due to the complexity of the character-reading system of the present invention, only the recognition circuitry for the letter K will be described, since, by reference to FIGS. 10A through 10F, it will be apparent how to implement the remaining circuitry. It should be noted that some of the threshold registers are specified as containing a negative count. This may be accomplished in a manner known in the art by using a designation bit by which a 0 may represent a positive number and a 1 may represent a negative number. This designation bit will then be employed by the associated comparator, so that it treats the number in the register as either a positive number or a negative number according to the designation bit. The programming flow chart in FIGS. 10A to 10F shows the recognition logic that is employed in the optical character reader of the present invention.

Figure 8:
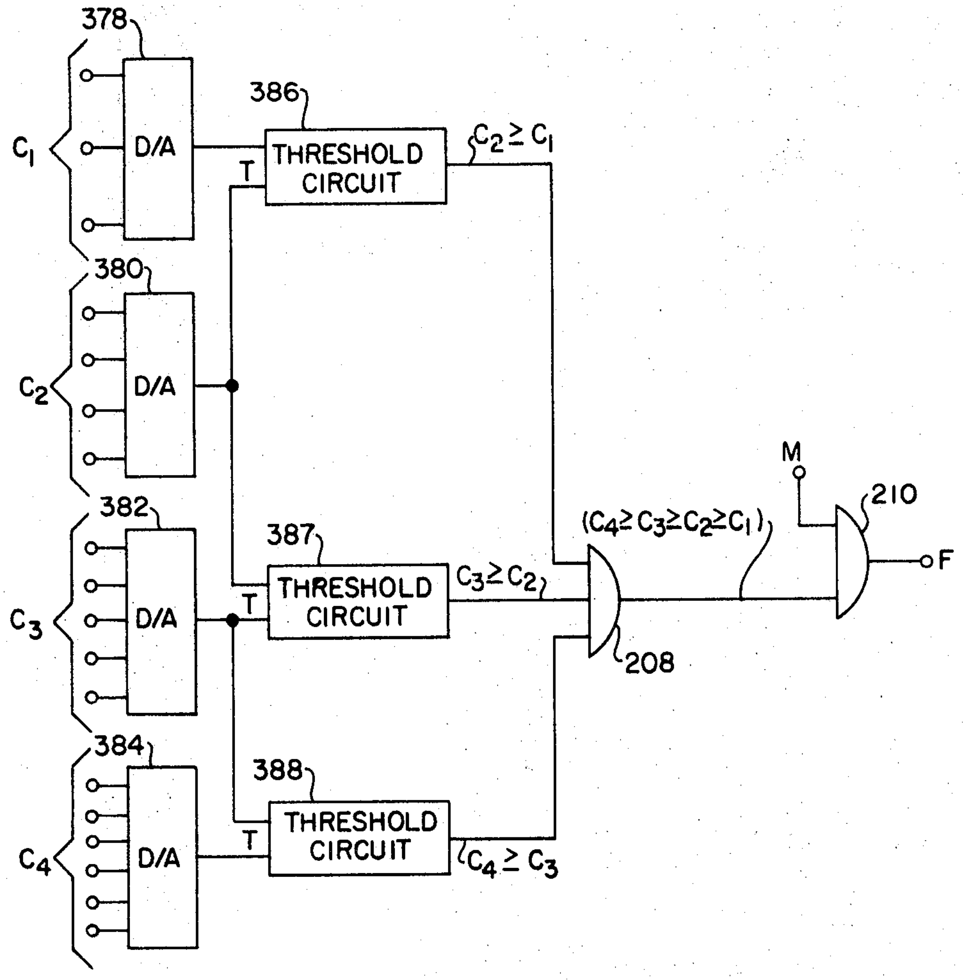
FIG. 8 is a block diagram representation of the analog equivalent of the implementation of the first group comparison signals.

FIG. 8 shows an analog embodiment for producing the required comparison signal output of the AND gate 208 and also the F signal output of the AND gate 210. In this analog implementation, the comparators 202, 204, and 206 of FIGS. 6A and 6B are eliminated, and the digital-to-analog converters 378 through 384 are coupled to the output gates 236 through 270 of FIGS. 6A and 6B. The output gates 236 through 270 in turn receive signals from the counters 178 through 184, respectively. The analog voltage from the digital-to-analog converter 380, which represents the count $C_2$, is coupled to a threshold circuit 386, where it is employed as the threshold-determining level. The output of the digital-to-analog converter 378, which represents the count $C_1$, is coupled to the same threshold circuit 386. The threshold circuit 386, therefore, produces an output signal only when the count $C_2$ is equal to or greater than the count $C_1$, or, in other words, it performs the same function as the digital comparator 202 of FIG. 6A.

The digital-to-analog converter 380 is also coupled to the threshold circuit 387. The threshold input of the threshold circuit 387 is supplied by the digital-to-analog converter 382, which produces an analog representation of the count $C_3$ from the counter 182. The output of the threshold circuit 387 will be produced whenever the count $C_3$ is equal to or greater than the count $C_2$, and thus the threshold circuit 386 performs the same function as the comparator 204 of FIG. 6A.

The output of the digital-to-analog converter 382 is also coupled to the threshold circuit 388. The output of the digital-to-analog converter 382 is coupled to the threshold input of the threshold circuit 388, and the threshold circuit 388 will, therefore, produce an output only if the count $C_4$ is equal to or greater than the count $C_3$, and the threshold circuitry 388, therefore, performs the same function as the comparator 206 of FIG. 6B.

The outputs of the threshold circuits 386, 387, and 388 are all coupled to the AND gate 208, which produces the desired comparison signal. In a corresponding manner, the output of the AND gate 210 produces the required F-signal whenever the M-signal from the flip-flop 152 of FIG. 5 is present on its other input.

Figure 9:
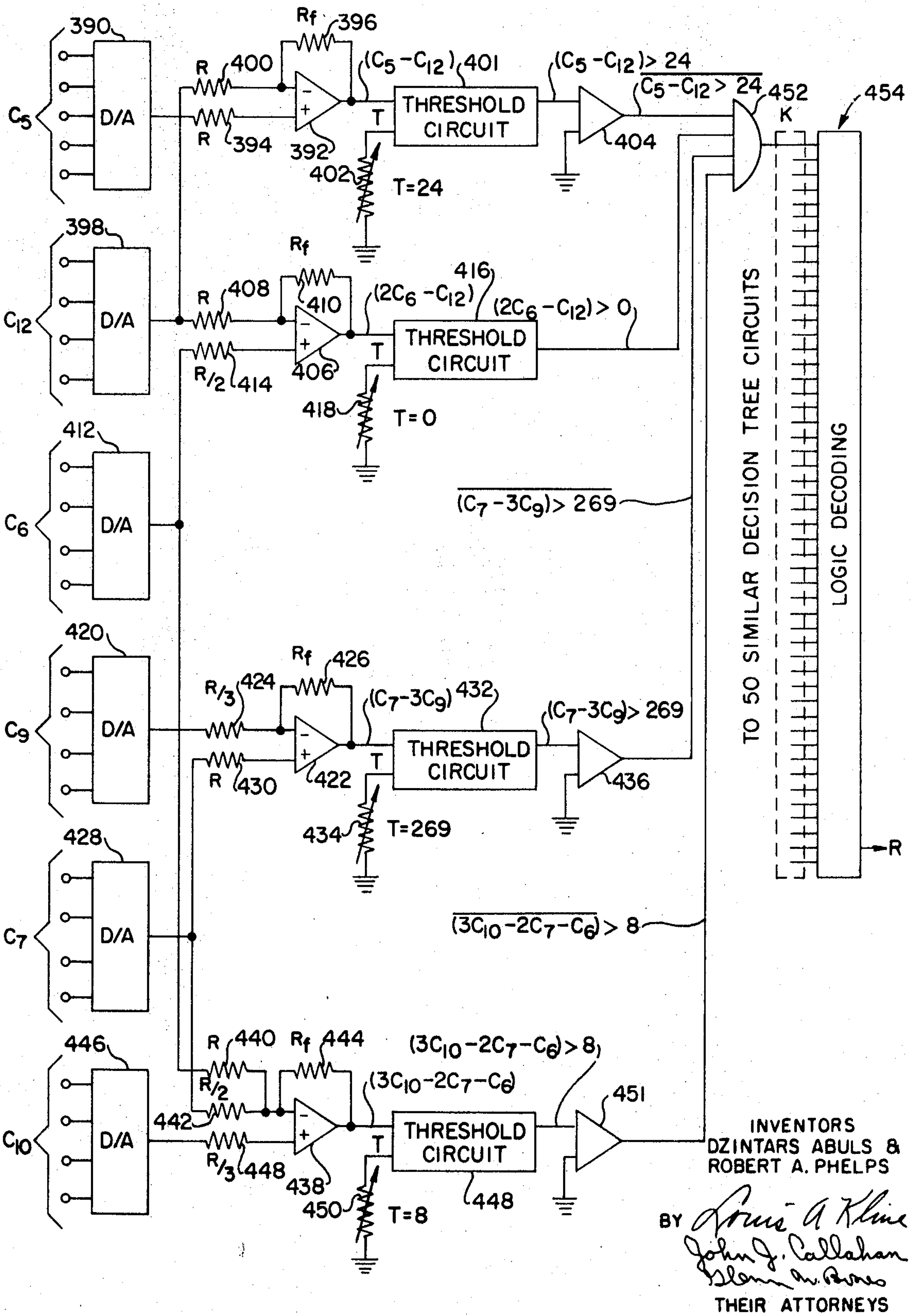
FIG. 9 is a block diagram representation of the analog implementation of the recognition logic circuitry that is required to recognize a K.
Figure 10A:
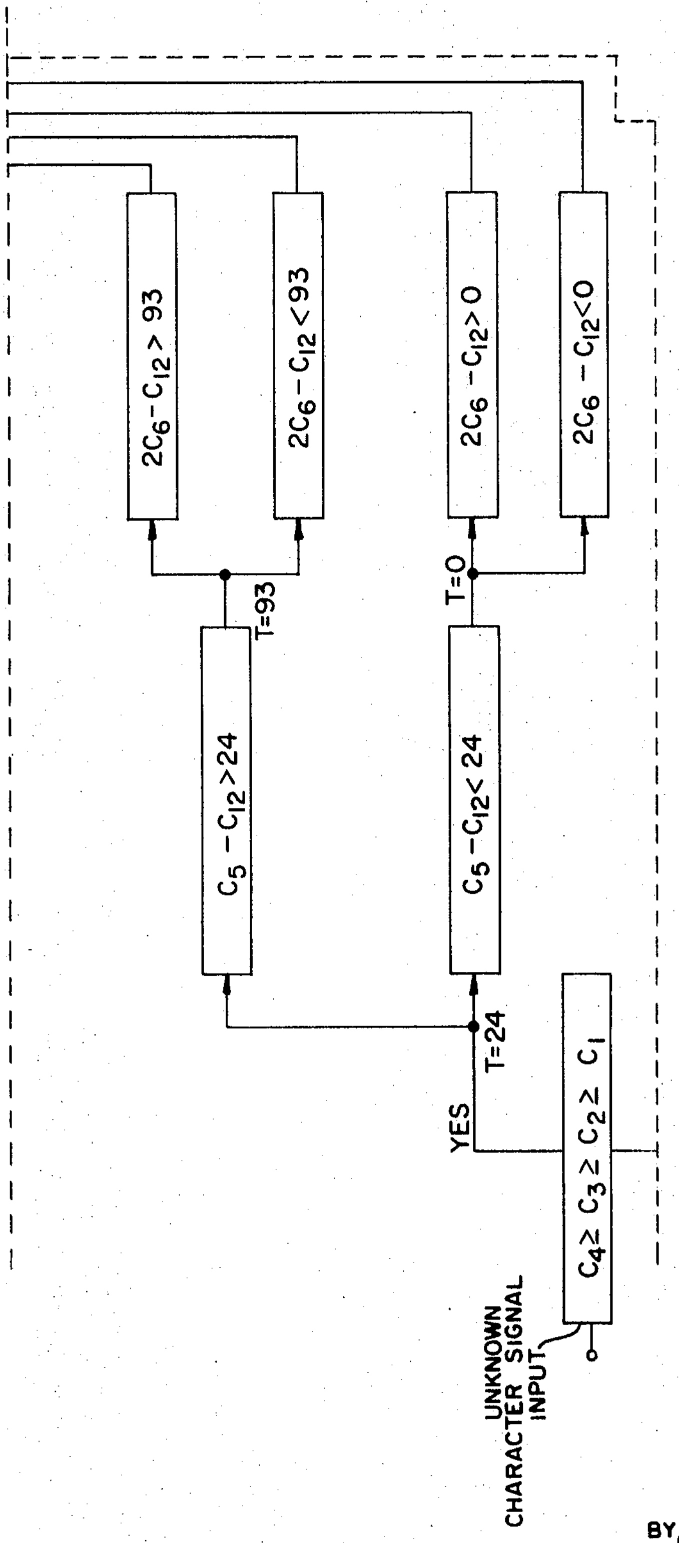
FIGS. 10A through 10F show a programming flow chart of the recognition logic that is employed in the reader.
Figure 10B:
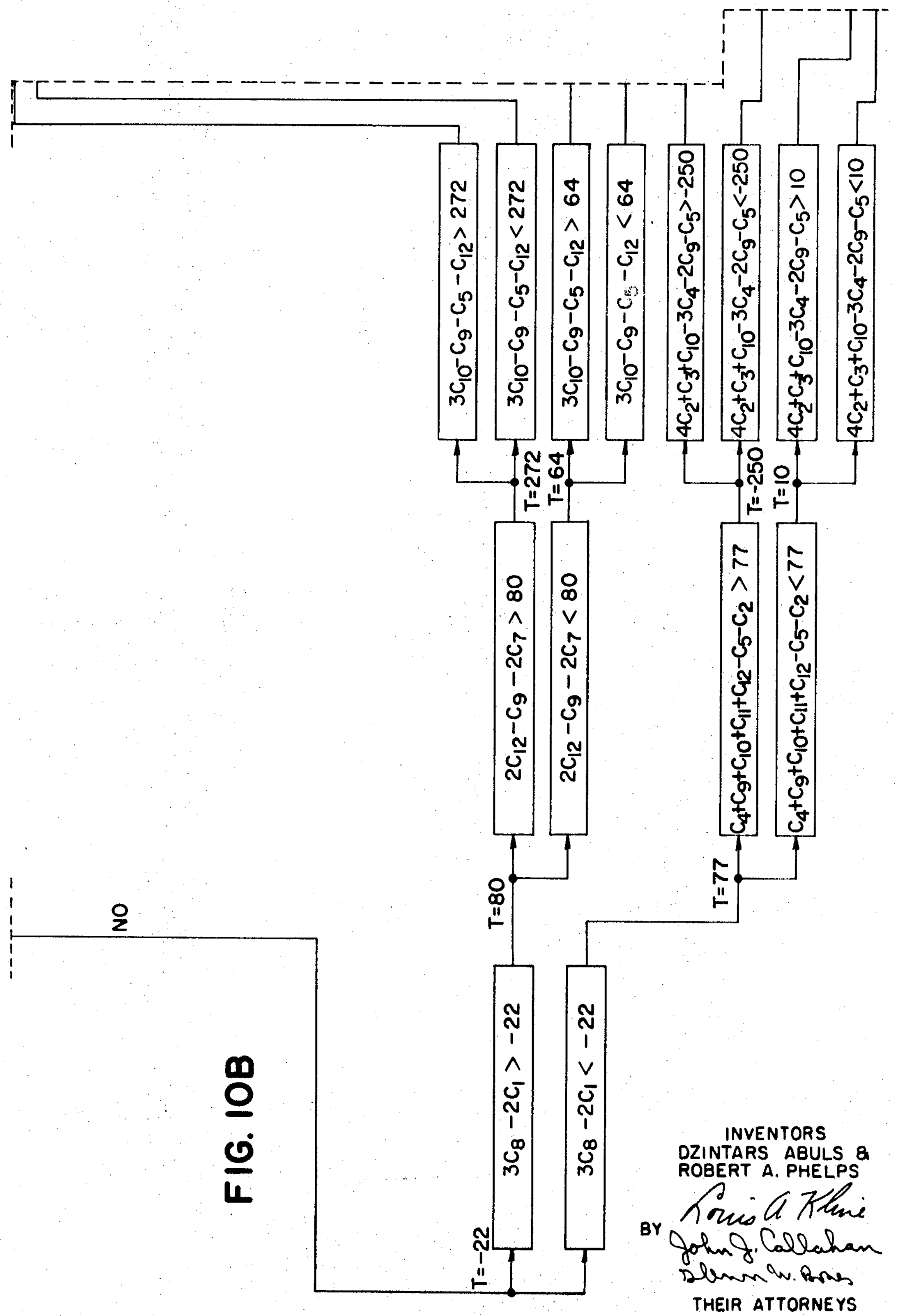
Figure 10C:
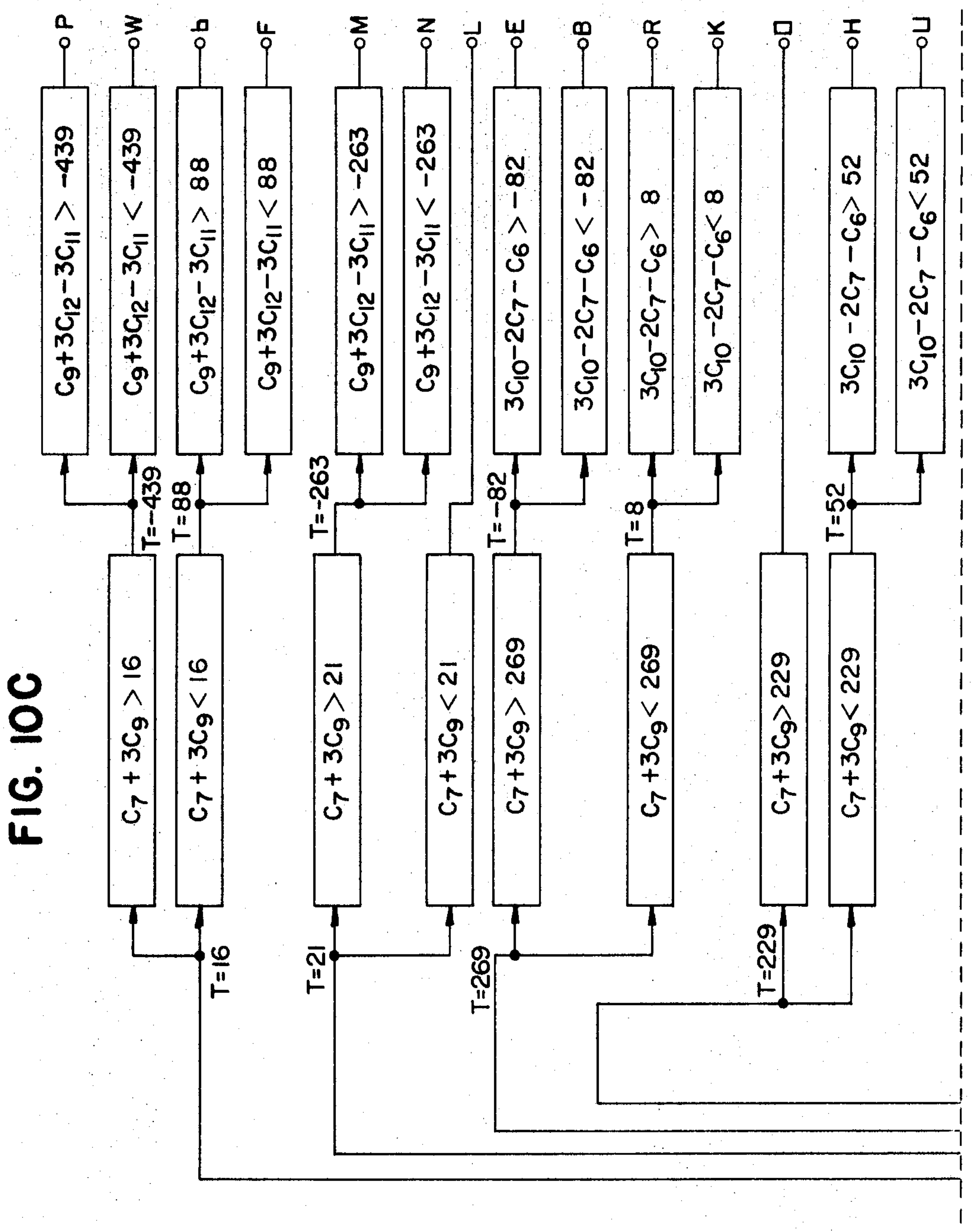
Figure 10D:
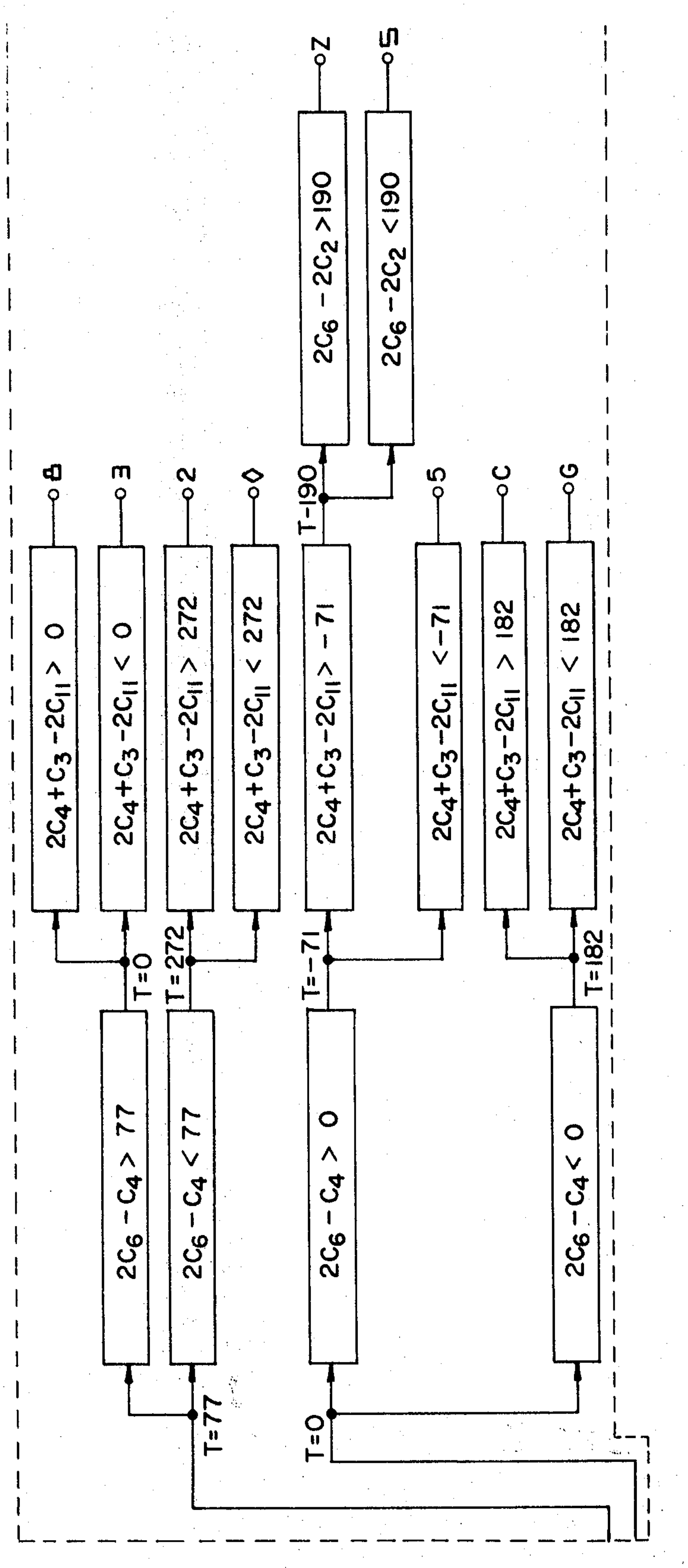
Figure 10E:
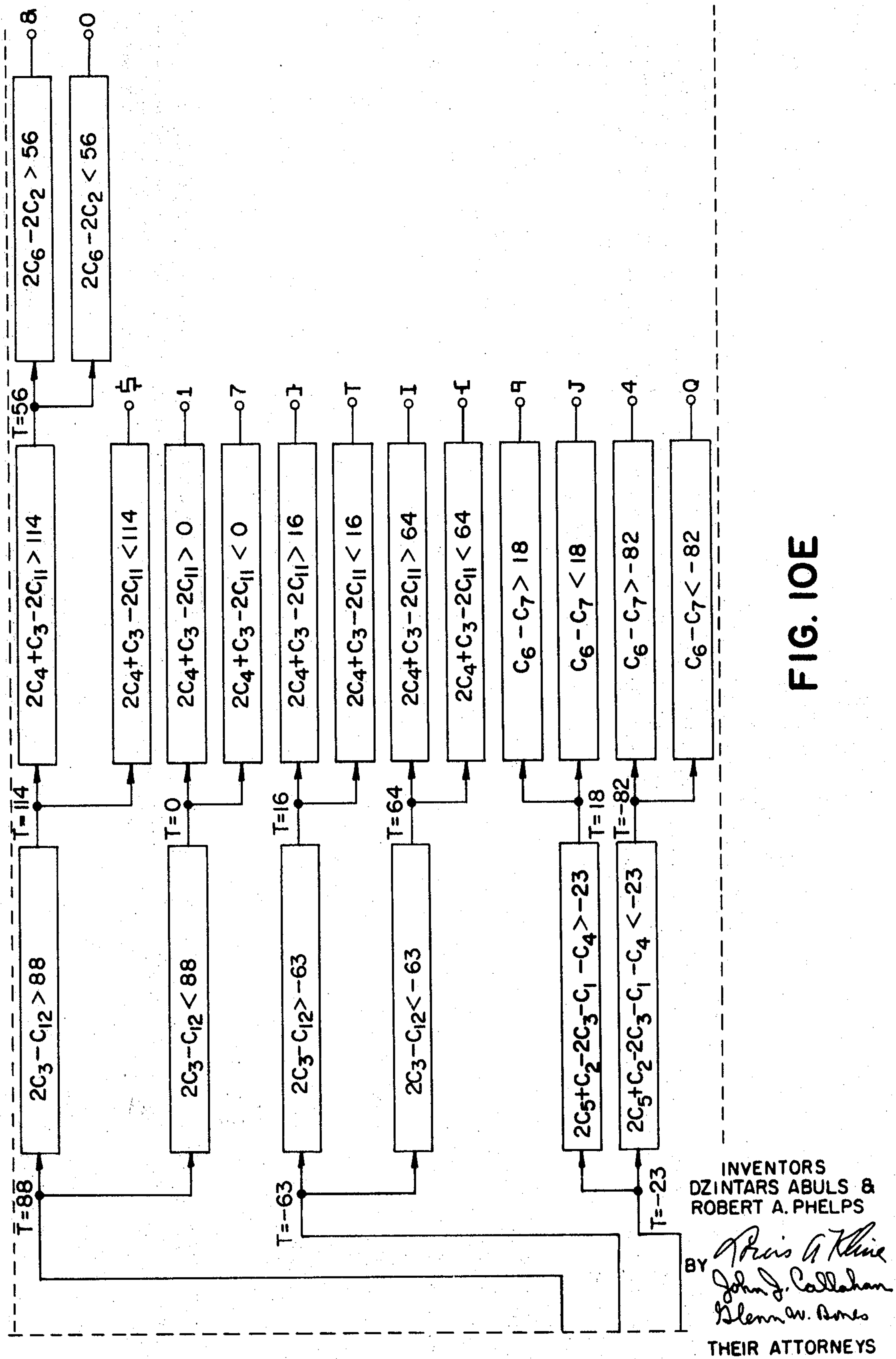
Figure 10F:
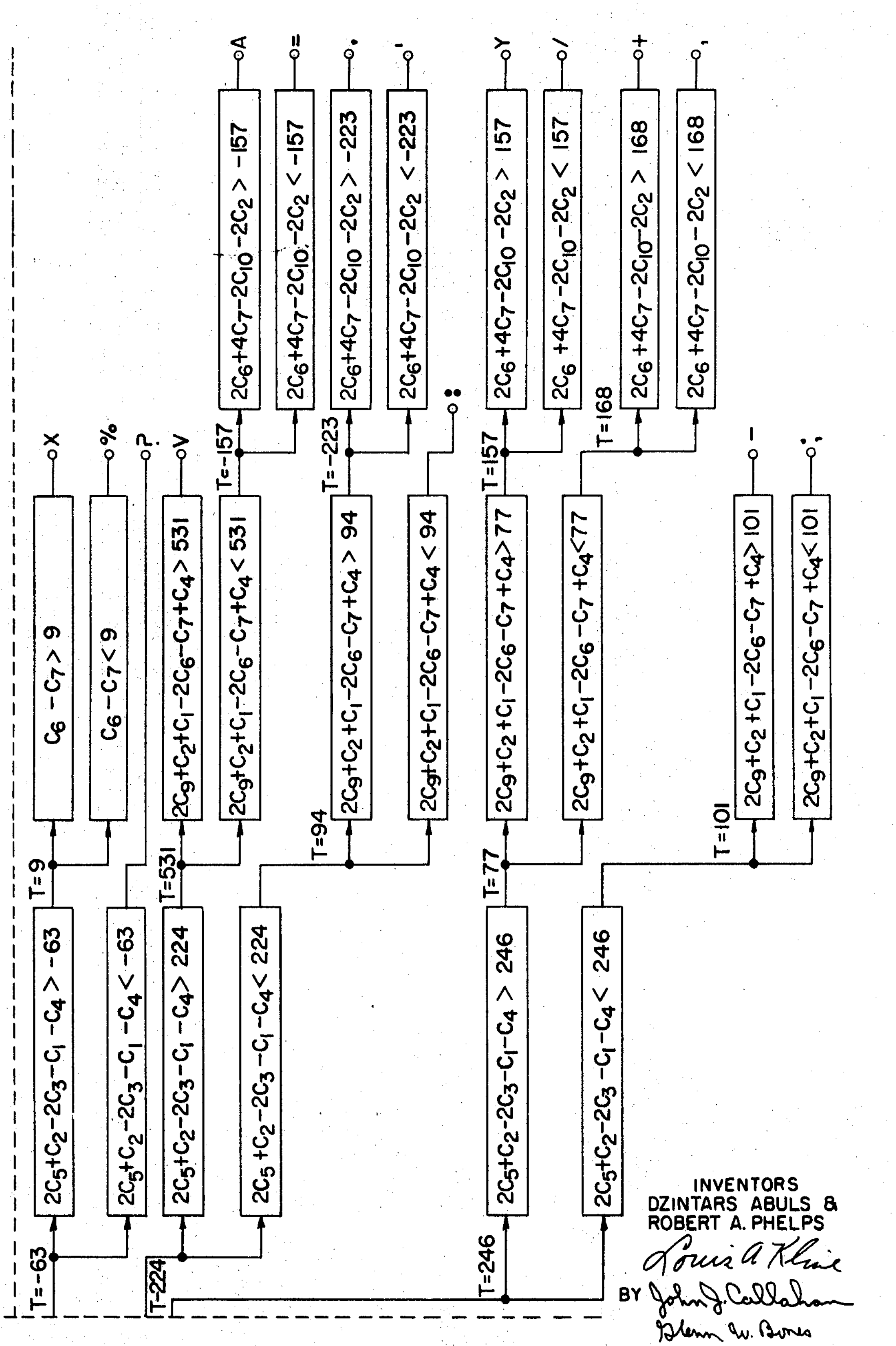

An analog recognition circuit is shown in FIG. 9 which is analogous to the digital recognition circuit for the character K that is shown in FIG. 7. In the embodiment of FIG. 9, the $C_5$ count from the counter 186 of FIG. 6B, which corresponds to segment 1 of group 2, is coupled to the digital-to-analog converter 390 to produce an analog representation of the $C_5$ count in the counter 186. The output of the digital-to-analog converter 390 is coupled to the differential summing amplifier 392 through the input resistor 394, which is coupled to the positive, or addition, input terminal of the differential summing amplifier 392. The feedback resistor 396 is coupled between the output terminal and the negative, or subtraction, input terminal of the differential summing amplifier 392. An analog voltage corresponding to the $C_{12}$ count from the counter 200 of FIG. 6E, which corresponds to segment 4 of group 3, is coupled from the digital-to-analog converter 398 to the negative, or subtraction, input terminal of the differential summing amplifier 392 through the input resistor 400. Since the input resistors 394 and 400 both have identical values of R-ohms, the output of the differential summing amplifier 392 will be a voltage which is proportional to $C_5$ minus $C_{12}$. The output of the differential summing amplifier 392 is then coupled to the threshold circuit 401, which has its threshold level determined by a variable resistor 402. The threshold circuit 401 will then produce an output whenever the output of the differential summing amplifier 392 is greater than the specified threshold value, which for the threshold circuit 401 of FIG. 9 is a relative value of 24. The output of the threshold circuit 401 is inverted by the inverter 404, and this output signifies that the difference between $C_5$ and $C_{12}$ is not greater than the threshold level of 24.

The output of the digital-to-analog converter 398, which represents the $C_{12}$ count, is also coupled to the differential summing amplifier 406 through the input resistor 408, which is coupled to the negative, or subtraction, input terminal of the differential summing amplifier 406. The resistor 410, which is connected between the negative input terminal and the output terminal of the differential amplifier 406, is the required feedback resistor. The digital-to-analog converter 412 is coupled to receive the $C_6$ count from the counter 188 of FIG. 6C, which represents segment 2 and group 2. The output of the digital-to-analog converter 412 is coupled to the positive input terminal of the differential input amplifier 406 through the resistor 414. The resistor 414 has a value of R/2, while the resistor 408 has a value of R, and therefore the output of the differential summing amplifier 406 will indicate two times the $C_6$ count minus the $C_{12}$ count. The output of the differential summing amplifier 406 is coupled to the threshold circuit 416, where this signal is compared with the threshold voltage from the threshold resistor 418, which in this instance has a zero relative value, and the output of the threshold circuit 416 therefore indicates that two times the $C_6$ count minus the $C_{12}$ count is greater than zero.

Figure 6D:
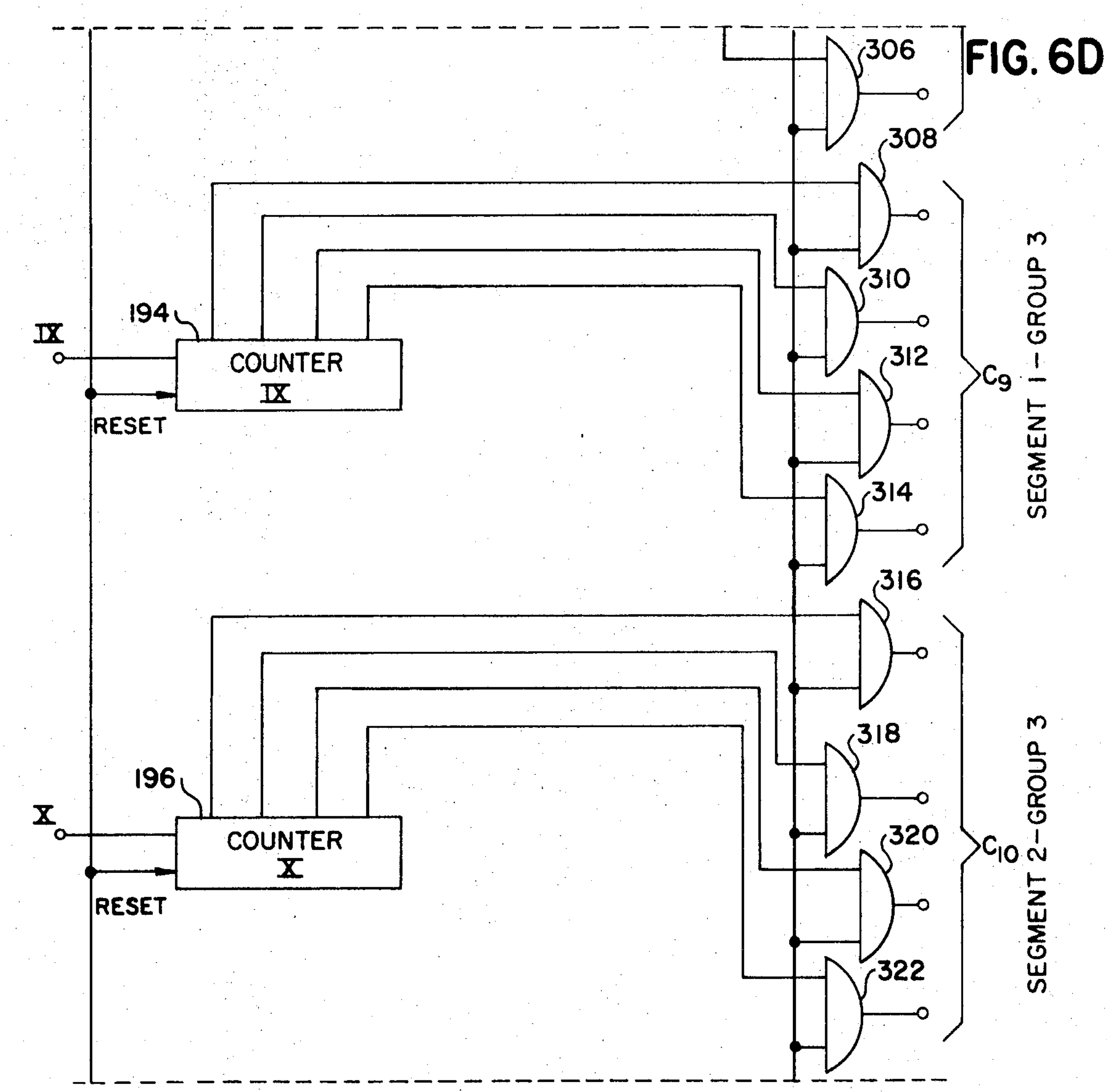
Figure 6E:
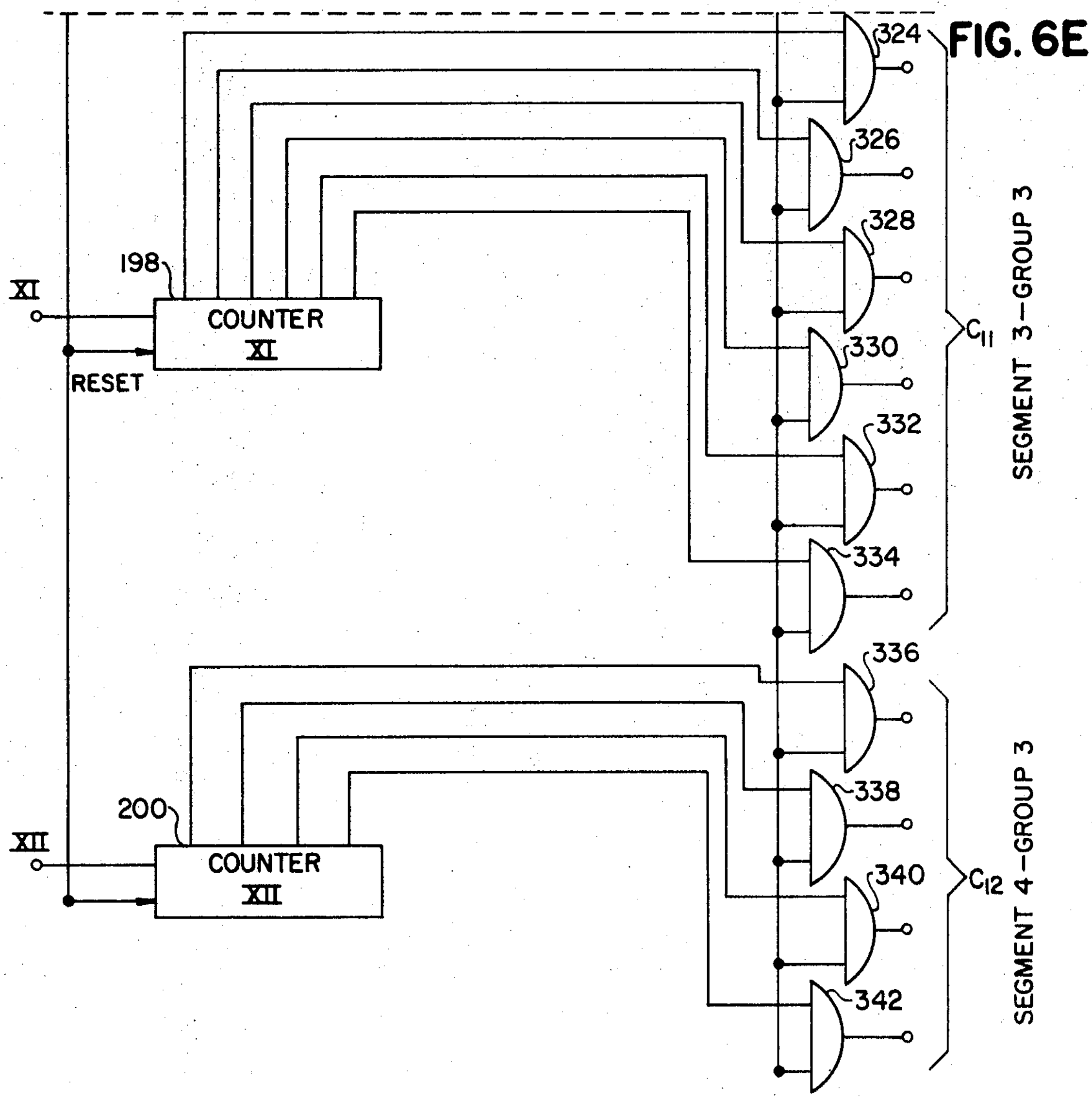

The $C_9$ count, which is derived from the counter 194 of FIG. 6D and which corresponds to segment 1 and group 3, is coupled to the digital-to-analog converter 420. The output of the digital-to-analog converter 420. The output of the digital-to-analog converter 420 is coupled to the negative, or subtraction, input terminal of the differential summing amplifier 422 through the input resistor 424. The feedback resistor for the differential amplifier 422 is the resistor 426. An analog representation of the $C_7$ count, which is derived from the counter 190 and which corresponds to segment 3 of group 2, is coupled from the digital-to-analog converter 428 to the positive, or addition, input terminal of the differential summing amplifier 422 through the input resistor 430. The value of the input resistor 424 is R/3, and the value of the input resistor 430 is R; therefore, the output of the differential input summing amplifier 422 signifies $C_7$ minus three times $C_9$. The output of the differential summing amplifier 422 is supplied to the threshold circuit 432, which has its threshold level determined by the threshold resistor 434, which is set to a value of 269. The output of the threshold circuit 432 is inverted by the inverter 436, and the output of the inverter 436, therefore, signifies that $C_7$ minus three times $C_9$ is not greater than 269.

The analog representation of the $C_6$ count which is produced by the digital-to-analog converter 412 is also coupled to the negative input terminal of the differential input amplifier 438 through the input resistor 440. The analog representation of the $C_7$ count which is produced by the digital-to-analog converter 428 is coupled to the negative, or subtraction, input terminal of the differential summing amplifier 438 through the input resistor 442. The feedback resistor for the differential summing amplifier 438 is the resistor 444. (All of the feedback resistors 396, 410, 426, and 444 may be equal in value if identical differential amplifiers 392, 406, 422, and 438 are employed.). The $C_{10}$ count, which is derived from the counter 196 of FIG. 6D and which is associated with segment 2 of group 3, is coupled to the digital-to-analog converter 446, which produces an analog representation of the $C_{10}$ count. The output of the digital-to-analog converter 446 is coupled to the positive, or addition, input terminal of the differential summing amplifier 438 through the input resistor 448. The input resistor 440 has a value of R, the input resistor 442 has a value of R/2, and the input resistor 448 has a value of R/3. The output of the differential summing amplifier 438, therefore, signifies: $(3C_{10}-2C_7-C_6)$. The output of the differential summing amplifier 438 is coupled to the threshold circuit 448, which has its threshold level determined by the threshold resistor 450, which in this embodiment is set to determine a threshold level of 8. The output of the threshold circuit 448 is inverted by the inverter 451, which indicates that $(3C_{10}-2C_7-C_6)$ is not greater than 8.

The outputs of the inverters 404, 436, and 451 and the threshold circuit 416 are all coupled to the AND gate 452, which, when satisfied, will indicate that a K has been recognized. The output of the AND gate 452 is coupled to the logic decoding section 454, where binary-to-decimal decoding may be accomplished, if desired. Upon completion of the desired decoding, a reset signal R is supplied by the recognition decoding circuitry 454 to reset the counters 178 through 200 of the FIGS. 6A through 6E, and the flip-flop 234 of FIG. 6A. As in the digital embodiment, it is necessary to supply negative threshold readings for the recognition of certain characters. In the analog embodiment of FIG. 9, one method of achieving this is to assign an arbitrary zero value to a particular setting of a threshold resistor, so that adjustment of the resistor in one direction will represent a negative value and adjustment in the other direction will represent a positive value.

The embodiments of FIGS. 7 and 9 are equivalent logically to each other and to the programming flow chart representation for the recognition of a K, which is shown in FIGS. 10A through 10F. The programming flow chart of FIGS. 10A through 10F shows the implementation that is required to recognize all of the characters of the standard ASA-type font. The decision tree decoding logic of the programming flow chart of FIGS. 10A through 10F was determined by statistical analysis of the ASA-type font from data obtained using the described scans.

We claim:

1. A device for recognizing a data pattern having a predetermined definition, comprising:

a. scanning means for scanning the data pattern with a plurality of scan lines along a plurality of nominal scan paths to produce recognizable indications of the data pattern;

means to periodically activate the scanning means as the scan traverses the data pattern;

c. sensing means for sensing the recognizable indications that are produced by the scanning means;

d. analyzing means for analyzing recognizable indications, the analyzing means comprising means to produce a plurality of count signals, each of which signifies the number of recognizable indications that are sensed by the sensing means in a predetermined portion of a selected scan line which exceed a predetermined level;

e. evaluating means for evaluating recognizable indications and for producing recognition signals that are representative of the data pattern being scanned as a result of such evaluation, the evaluating means comprising means to establish a plurality of threshold signals, means to arithmetically combine selected count signals and to selectively weight these combined signals against selected threshold signals to produce a plurality of comparison signals that indicate whether the selectively combined signals are greater or less than their associated threshold signal, and means to logically combine the plurality of comparison signals to produce a recognition signal that is representative of the data pattern being read, each comparison signal that is produced being logically combined with one set of comparison signals when that comparison signal is greater than its associated threshold signal, and each comparison signal that is produced being logically combined with another set of comparison signals when that comparison signal is less than its associated threshold signal, with the plurality of recognition signals that are produced in this manner being each representative of a particular predetermined data pattern;

f. gate means coupled to the sensing means, the analyzing means, and the evaluating means for selectively gating recognizable indications sensed by the sensing means to the analyzing means and to the evaluating means whenever the gate means is enabled;

g. enabling means coupled to the sensing means and to the gate means for enabling the gate means whenever a predetermined amount of recognizable indications are sensed by the sensing means following a prior disablement of the gate means;

h. disabling means coupled to the gate means at a predetermined scan position following enablement of the gate means during a scan line; and i. means coupled to the scanning means and to the analyzing means for producing selective deflection of one or more segments of one or more subsequent scan lines from their nominal scan paths in accordance with recognizable indications that are sensed by the sensing means from one or more antecedent scan lines and are analyzed by the analyzing means.

2. A device as in claim 1 wherein the means to periodically activate the scanning means comprises clock means to produce repetitive clock signals which are coupled to the scanning means and the scanning means is activated only during the receipt of a clock signal;

the enabling means for enabling the gate means is coupled to the clock means, with the enabling means being effective to count and to compare the number of clock signals produced by the clock means and the number of recognizable indications sensed by the sensing means during a predetermined length of scan and to enable the gate means whenever the two numbers coincide; and the disabling means is coupled to the clock means, with the disabling means being effective to disable the gate means upon the receipt of a predetermined number of clock signals following enablement of the gate means by the enabling means.